(12) United States Patent
Oka et al.

(10) Patent No.: US 8,262,427 B2
(45) Date of Patent: Sep. 11, 2012

(54) DEFECT CORRECTING APPARATUS AND DEFECT CORRECTING METHOD

(75) Inventors: Akiko Oka, Tokyo (JP); Gaku Izumi, Tokyo (JP); Tomoaki Honda, Aihi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/228,666

(22) Filed: Sep. 9, 2011

(65) Prior Publication Data

US 2012/0071056 A1 Mar. 22, 2012

(30) Foreign Application Priority Data

Sep. 17, 2010 (JP) ................. 2010-210070

(51) Int. Cl.
*H01L 31/00* (2006.01)
*H01J 9/50* (2006.01)

(52) U.S. Cl. .................. 445/2; 445/24; 438/4

(58) Field of Classification Search ............. 445/2, 3, 445/24; 315/169.1–169.4; 438/4, 12
See application file for complete search history.

(56) References Cited

FOREIGN PATENT DOCUMENTS
JP 2008-15993 7/2008

*Primary Examiner* — Joseph L Williams
(74) *Attorney, Agent, or Firm* — SNR Denton US LLP

(57) ABSTRACT

The present disclosure provides a defect correcting apparatus including a defect detecting device configured to detect a defect within a repetitive pattern in a multilayer substrate a defect correcting device configured to correct the defect in the multilayer substrate by a specified defect correcting method, and a control device configured to, when the defect detected by the defect detecting device is detected overlapping a region in which occurrence of an interlayer short-circuit defect is assumed, generate an object corresponding to the defect correcting method for the interlayer short-circuit defect, and controlling the defect correcting device for correcting the defect using the generated object.

6 Claims, 28 Drawing Sheets

ENCLOSURE ZAPPING

STATIONARY ZAPPING

DEFECT CORRECTING APPARATUS AND DEFECT CORRECTING METHOD

BACKGROUND

The present disclosure relates to defect correcting technology carried out in a process of manufacturing a display device, and particularly to a defect correcting apparatus and a defect correcting method suitable for correcting a defect in a device pattern or a wiring pattern formed on a substrate such as a TFT (Thin Film Transistor) substrate of a FPD (flat panel display) or the like.

So-called flat panel displays such as organic EL (Electro Luminescence) displays, liquid crystal displays, and the like are now spread as display devices. These display devices are formed by a wiring substrate including elements such as a thin film transistor (TFT), a capacitor, and the like as well as various conductive members such as a plurality of pieces of wiring (for example signal wiring and potential supplying wiring) electrically coupled to these elements.

In the mass production of a wiring substrate forming such a display device, a so-called defect, such as a short circuit, which means that pieces of wiring or elements originally arranged so as to be separated from each other are electrically coupled to each other, a break, which means that internal parts of wiring or an element originally provided continuously are separated from each other, or the like, occurs due to the presence of foreign matter, for example. As the display device is increased in size, the occurrence of defects at the time of mass production increases defective parts occurring in the TFT substrate serving as a wiring substrate for driving the display device, and invites a decrease in yield. Thus, a defect correcting process for correcting (repairing) the defective parts may be essential.

Methods for correcting such defects as a short circuit, a break and the like include for example a method of cutting a short-circuit part by laser light irradiation (laser repair) and the connection of a break part by a laser CVD (Chemical Vapor Deposition) method.

For example, the present applicant has proposed a defect correcting method that divides a unit pixel (wiring section) on a substrate into a plurality of regions, selects an appropriate method for each region, and corrects defects (see Japanese Patent Laid-Open No. 2008-159930, hereinafter referred to as Patent Document 1).

SUMMARY

When correction is made with a difference image between a defect image (inspected image) and an image of a reference pattern (reference image) simply set as a defect area as described in Patent Document 1, there is a possibility of a failure in the correction unless the position and type of the defect, a state of a part of the substrate in which part the defect is present, and the like are grasped. This is because the selection of a defect correcting method and the selection of each of parameters such as the pulse period of laser light applied to the defect, laser power, the spot shape of the laser light, an oscillation time, and the like depend on the skills and experience of an operator, and a result of the selections differs according to the skills and experience of the operator.

In the case of a TFT substrate for a display or the like, a wiring section corresponding to each pixel includes not only signal wiring and scanning wiring but also a plurality of pieces of potential supplying wiring and other electric elements, and thus there have been remarkable increases in wiring density and in the complexity of a pixel structure within the pixel.

For example, also in correction of defects occurring in contact with same wiring, defects occurring at substantially a same position within the wiring section, and the like, it is necessary to select respective different defect correcting methods according to the types and the presence or absence of members situated around the defects. In addition, for example, when cutting a short-circuit part by laser light irradiation is considered, the deterioration of a peripheral thin film transistor (TFT) and the like due to thermal diffusion needs to be avoided.

An interlayer short-circuit defect between an upper layer and a lower layer as in a capacitor of a unit pixel (wiring section) on a TFT substrate, in particular, occurs at a high rate of incidence because the capacitor has a large area within the wiring section and the defect itself has a small size. However, a defect correcting method for making such effective correction has not been generally established. Thus, settings of laser light irradiation conditions (laser processing parameters) cost labor and time, and decrease work efficiency.

In a defect correcting process on a panel manufacturing line, a skilled operator checks a defect on the spot, determines a defect correcting method, and performs a defect correcting operation such as laser repair or the like, thus taking too much cycle time. Therefore, the speed of operation of the defect correcting process cannot reach the speed of mass production on an entire line. Accordingly, in many panel manufacturing plants, this problem is avoided by purchasing a plurality of defect correcting apparatus (repair machines) and increasing the number of operators in charge of the respective defect correcting apparatus.

However, the adoption of such an avoiding method causes a serious problem in that significant increases in the number of defect correcting apparatus and operators swell equipment cost and the cost of man-hours of the operators, and significantly reduce profits.

The present disclosure has been made in view of such a situation. It is desirable to improve the quality of defect correction while significantly improving the work efficiency of a defect correcting process for an interlayer short-circuit defect between an upper layer and a lower layer of a multilayer structure.

In the disclosure of the present application, a defect within a repetitive pattern in a multilayer substrate is detected by a defect detecting device included in a defect correcting apparatus in question. Next, when the defect detected by the defect detecting device overlaps a region in which the occurrence of an interlayer short-circuit defect is assumed, an object corresponding to a defect correcting method for the interlayer short-circuit defect is generated by a control device included in the defect correcting apparatus. Then, a defect correcting device for correcting the defect is controlled using the generated object.

Further, it is desirable to determine whether the defect correcting method can be performed for the generated object, and not to make defect correction when the defect correcting method based on the generated object is inappropriate.

According to the disclosure of the present application, the correction of an interlayer short-circuit defect, for which it has been difficult to set a defect correcting method and which defect correction has been unable to be automated in the past, can be automated.

According to the disclosure of the present application, it is possible to improve the quality of defect correction while significantly improving the work efficiency of a defect correcting process for an interlayer short-circuit defect.

DETAILED DESCRIPTION OF THE PREFERRED EMBODIMENTS

Figure 1:
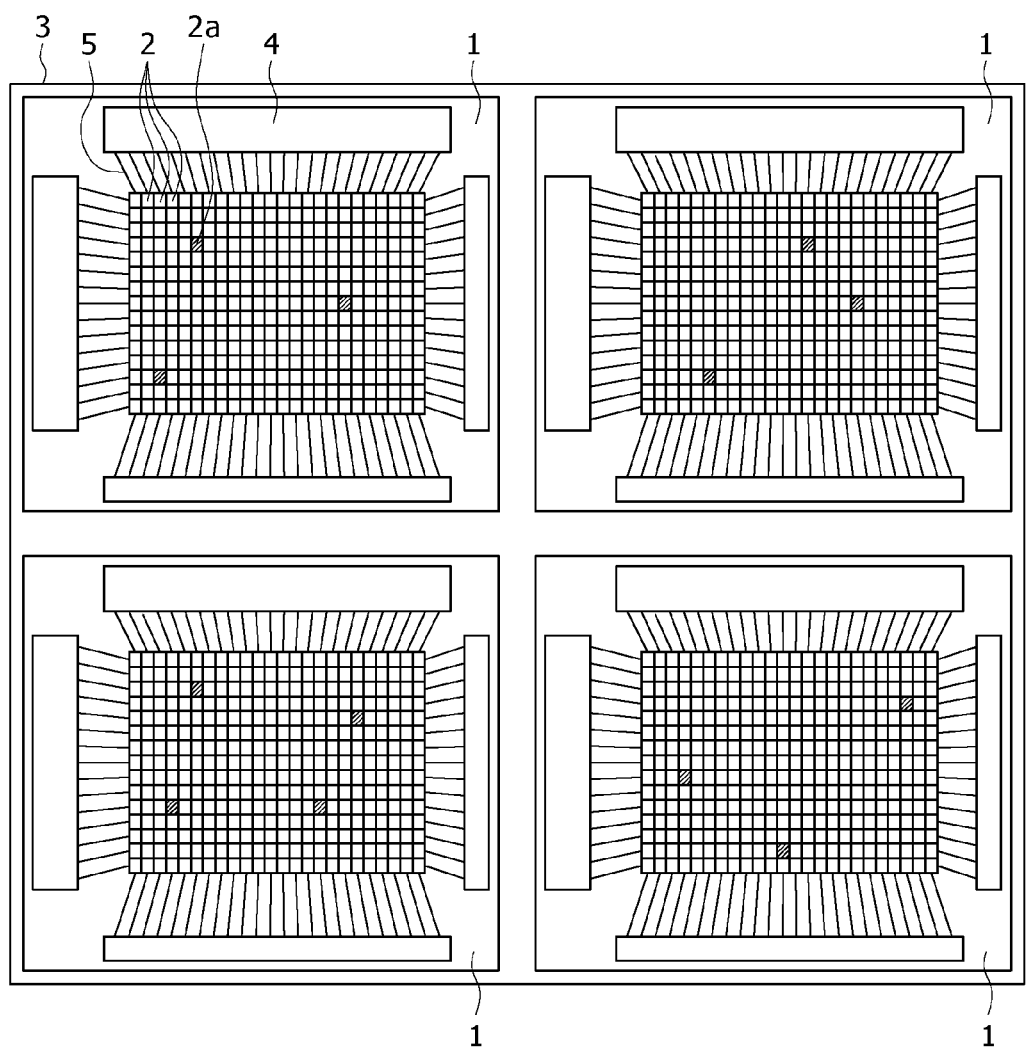
FIG. 1 is a diagram showing an example of configuration of a substrate as a target of inspection.

Examples of the mode for carrying out the present technology will hereinafter be described with reference to the accompanying drawings. Description will be made in the following order. Incidentally, common parts in the figures are identified by the same reference numerals, and repeated description thereof will be omitted or simplified.

1. One Embodiment (Example of Automatically Generating Leak Defect Repair Object)

Examples of embodiments to be described in the following are preferred concrete examples of the present technology. Therefore, technically preferable various limitations are added. However, the technical scope of the present technology is not limited to these forms unless there is a statement specifically limiting the present technology in the following description. For example, processing order, the numerical conditions of respective parameters and the like cited in the following description are merely preferred examples, and sizes, shapes, and arrangement relations in the figures used in the description are also schematic examples.

<1. One Embodiment>

[Outlines]

In a present embodiment, description will be made of a case where a target wiring substrate forms a display device, that is, a case where a large number of wiring sections constituting a wiring substrate formed by a TFT substrate or the like are formed two-dimensionally so as to correspond to the pixels of a display device.

Figure 2:
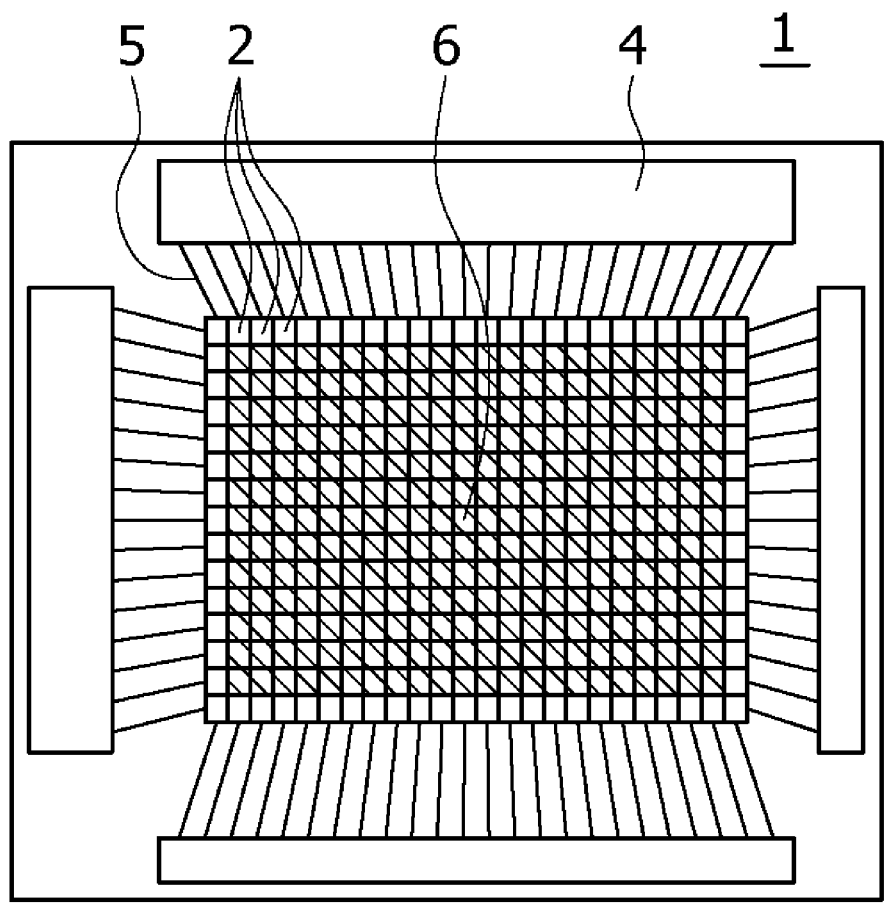
FIG. 2 is a diagram showing a repetitive pattern area within the substrate shown in FIG. 1.

FIG. 1 shows an example of a substrate in a process of manufacturing a flat panel display set as a correction target in the present technology. FIG. 2 is a diagram showing a repetitive pattern area within the substrate shown in FIG. 1.

In this example, the wiring substrates of four flat panel displays are formed on a common substrate 3. A wiring substrate 1 is divided into an area having a repetitive pattern to be described later (repetitive pattern area 6) (see FIG. 2), the area of a peripheral circuit 4 connected from the repetitive pattern to the outside via wiring 5 (peripheral circuit area), and the area of an outermost circumference (outermost circumferential area) as a boundary between the repetitive pattern area 6 and the peripheral circuit area. The repetitive pattern area 6 and the outermost circumferential area are obtained by forming wiring sections 2 two-dimensionally so as to correspond to the pixels of the flat panel display. As shown in FIG. 2, the repetitive pattern area 6 is a part of a region where the wiring sections 2 are formed repetitively excluding the outermost circumferential area.

Figure 3:
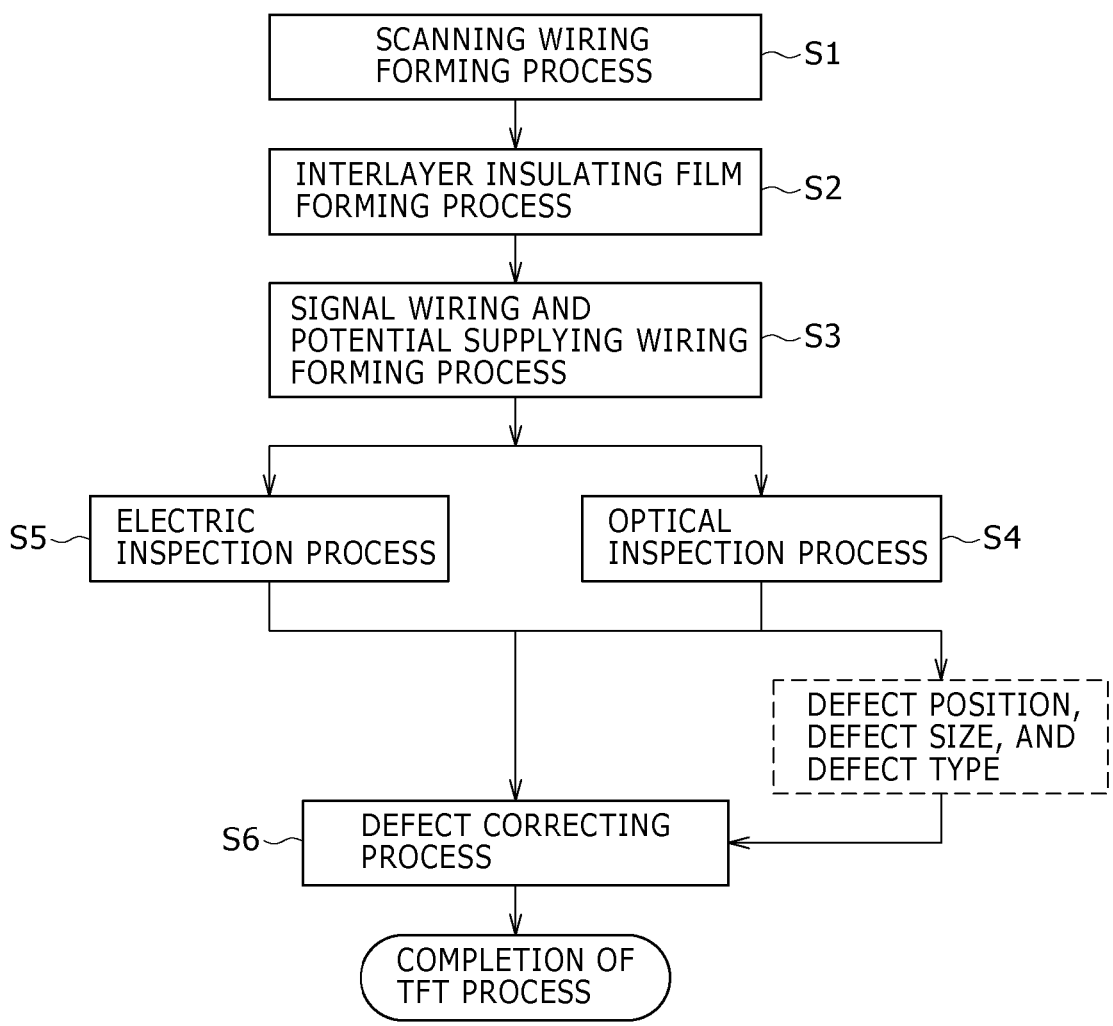
FIG. 3 is a flowchart of a process of manufacturing a wiring substrate of a flat panel display.

FIG. 3 shows a flow of a process of manufacturing the wiring substrate of a flat panel display, that is, a flow from a wiring pattern forming process through a defect inspecting process to a defect correcting process.

In the present embodiment, a wiring section forming process is first performed by forming scanning wiring, an interlayer insulating film, and signal wiring and potential supplying wiring in a laminated manner as a main constitution of intended wiring sections 2 on a substrate 3 (steps S1, S2, and S3). In addition, a peripheral circuit 4 and wiring 5 are formed, and the peripheral circuit 4 is connected to wiring sections 2 in the outermost circumferential area. The process of forming the peripheral circuit 4 and the wiring 5 may be performed either before or after the process of forming the scanning wiring, the interlayer insulating film, the signal wiring and the potential supplying wiring in the above-described steps S1 to S3.

Next, an optical inspection process for detecting defective wiring sections 2a is performed by optically observing a large number of wiring sections 2 on the substrate 3 that comes flowing after undergoing the wiring section forming process (step S4). When a defective wiring section 2a is detected, the positional information of the defective wiring section 2a on the substrate 3 is sent to a computer (control device) of a defect correcting apparatus. In the optical inspection process, so-called pattern defect classification information indicating not only the presence of the defective wiring section 2a but also a defect (a pattern defect, foreign matter or the like) and the position of the defect is determined from an image including the defective wiring section 2a shown in FIG. 1 (defect image). Other features such as the size, type (for example a material or a state) and the like of the defect are also determined.

In addition, a defect occurring in other than a surface, which defect cannot be detected by the optical inspection process, is detected by an electric inspection process (step S5).

Then, in the defect correcting process, the defect position information is read so that the stage of the defect correcting apparatus is controlled to be moved to the position of the defect, the defect is confirmed by an observation system, and the defect is corrected by laser light irradiation or the like (step S6). Appropriate correcting methods for defects occurring in the wiring substrate 1 on the substrate 3 are different for the respective areas of the defects. When this process is ended, a TFT process (process of manufacturing the wiring substrate) is completed.

The correcting process is greatly improved in efficiency by configuring correction data in the past such that the correction data can be called up. Further, because correction data appropriate for the position, size, and type of the defect is selected, the process of correcting the defect, which process has been difficult to automate, can be automated.

Figure 4:
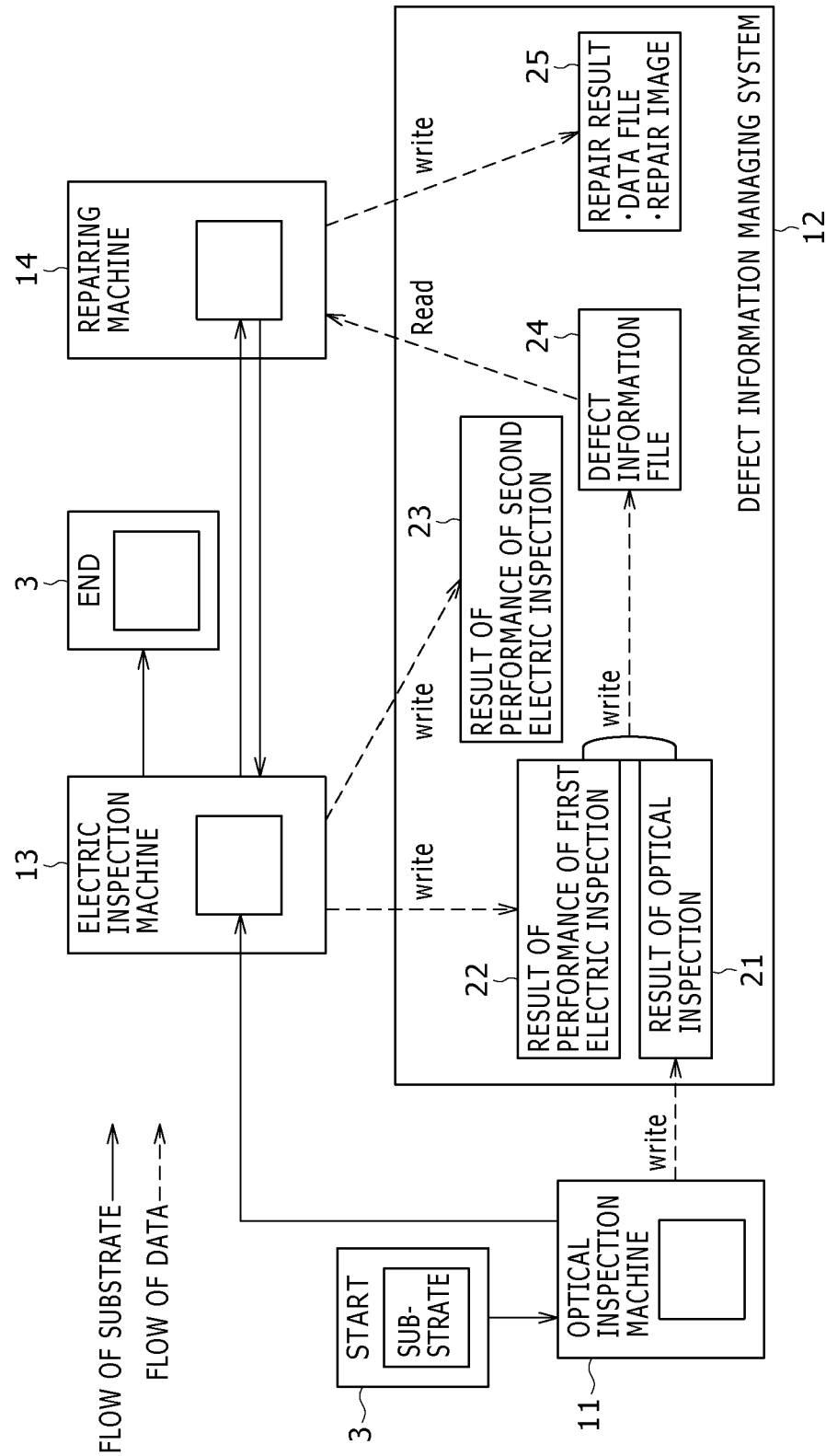
FIG. 4 is a diagram showing a concrete flow from a defect inspecting process to a defect correcting process in FIG. 3.

FIG. 4 is a block diagram showing a concrete flow from the defect inspecting process to the defect correcting process shown in FIG. 3.

The substrate 3 after undergoing the wiring section forming process is moved to an optical inspection machine 11 (first step). An optical inspection is performed to identify a defect. A result 21 of the inspection is output to a defect information managing system 12 (second step). In addition, the substrate 3 is moved to an electric inspection machine 13 (third step). An electric inspection is performed to identify a defect. A result 22 of the inspection is output to the defect information managing system 12 (fourth step). The defect information managing system 12 generates defect information, which is one of the two inspection results or is obtained by associating both of the two pieces of defect information with each other (fifth step), and records the defect information as a defect information file 24 in a memory. Meanwhile, the substrate 3 is moved from the electric inspection machine 13 to a repair machine 14 (sixth step), and the repair machine 14 receives the defect information file 24 from the defect information managing system 12.

The repair machine 14 automatically selects an appropriate repair method (defect correcting method: a template (repair object)) on the basis of the contents of the defect information file 24, performs repair, and outputs a result 25 of the repair (a data file, an image after the repair, and the like) to the defect information managing system 12 (seventh step). The defect information file 24 received together with the substrate 3 at this time also includes information on the layer structure of the substrate.

Thereafter, when necessary, the substrate 3 is moved to the electric inspection machine 13 (eighth step). The state of the defect after the repair is checked by electric inspection again. When necessary, defect information is output to the defect information managing system 12 again (ninth step). Then, the defect information can be sent to the repair machine 14 via the defect information managing system 12, and the substrate 3 is moved to the repair machine 14 (tenth step), to perform repair again.

[Example of Configuration of Defect Correcting Apparatus]

Figure 5:
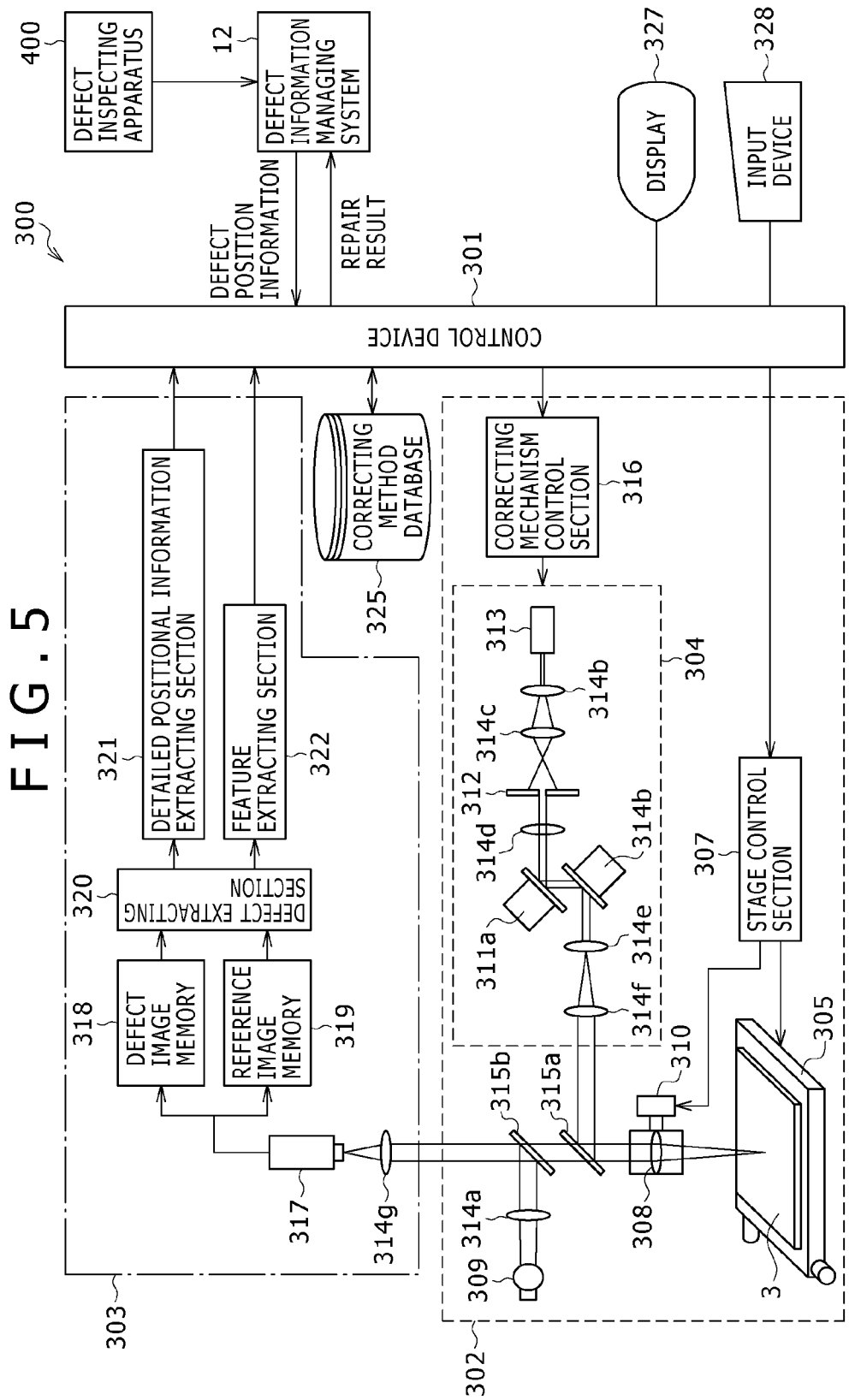
FIG. 5 is a diagram showing an example of configuration of a defect correcting apparatus according to an embodiment of the present disclosure.

FIG. 5 is a block diagram of an example of a defect correcting apparatus (corresponding to the repair machine 14) that performs a defect correcting process on the wiring substrate.

Figure 6:
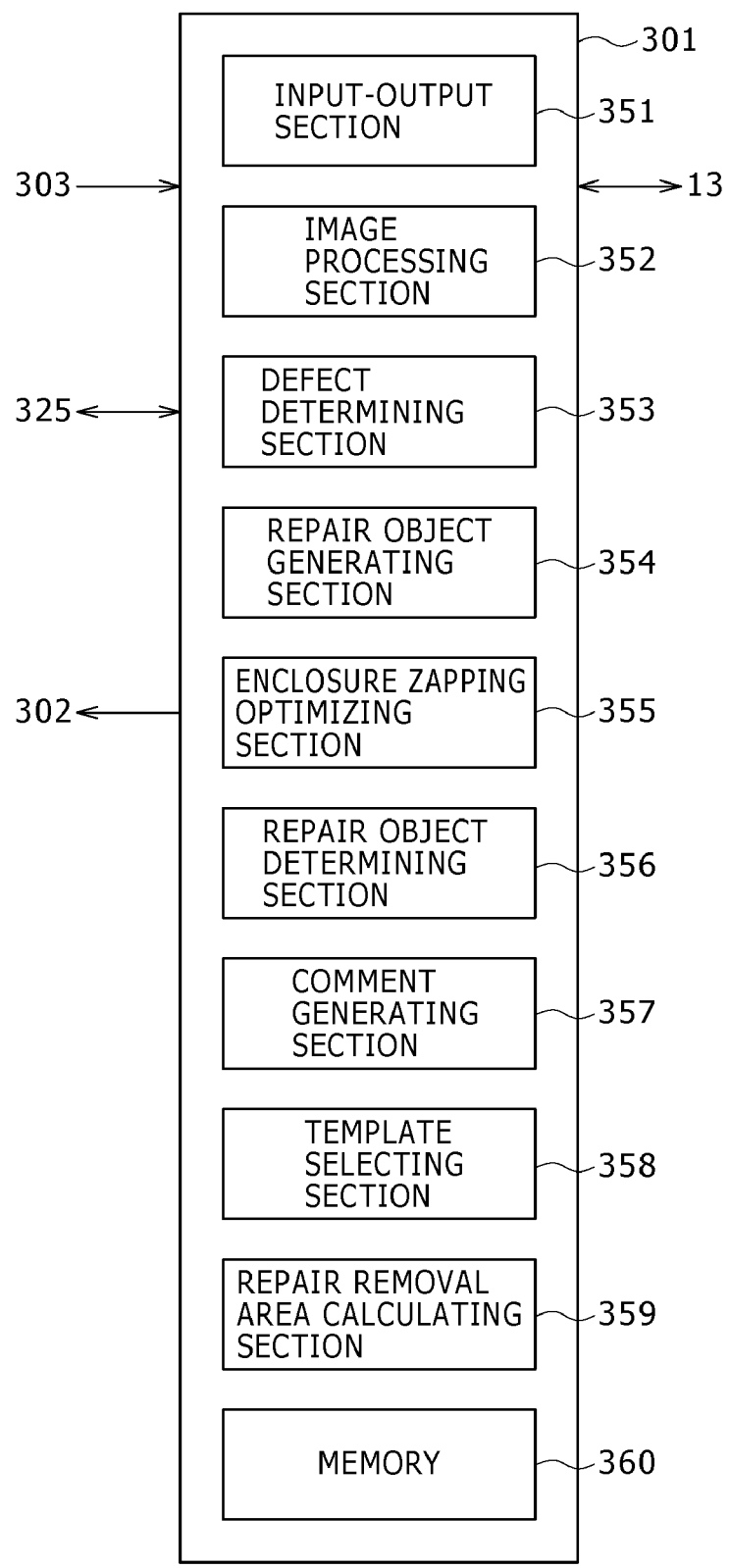
FIG. 6 is a diagram showing an internal configuration of a control device shown in FIG. 5.

The defect correcting apparatus 300 according to the present embodiment is an example of a so-called laser repair device for disconnecting a short-circuit part by laser light irradiation. However, the defect correcting apparatus 300 according to the present embodiment is also applicable to a device capable of performing a wiring connecting process such as a laser CVD (Chemical Vapor Deposition) method or the like (see FIG. 5 of Japanese Patent Laid-Open No. 2008-159930, for example). The defect correcting apparatus 300 includes a processing device capable of performing a laser CVD method between an objective lens 308 and the substrate 3. A detailed constitution of the processing device is shown in FIG. 5, FIG. 6, and the description of the same laid-open publication.

The defect correcting apparatus 300 is roughly composed of a control device 301, a defect correcting device 302, and a defect detecting device 303.

The control device 301 is connected to the defect information managing system 12 via a communication interface (not shown) or the like, and is connected to a display 327 and an input device 328 such as a keyboard or the like. The control device 301 obtains a result (defect information) of defect inspection performed in advance by a defect inspecting apparatus 400 via the defect information managing system 12, and selects an optimum template on the basis of the defect information. Then, the control device 301 controls the defect correcting device 302 for correcting defects and the defect detecting device 303 for performing detailed observation of defects. An MPU (Micro Processing Unit) or a computer (arithmetic processing unit) such as a personal computer or the like can be applied to the control device 301.

The control device 301 sends a command to a stage control device 307 in the defect correcting device 302 to move an XY stage 305 on which the substrate 3 is mounted and adjust the XY stage 305 such that a pixel having a defective part is directly below the objective lens 308. Next, a focus stage 310 is moved to adjust an interval between the objective lens 308 and the substrate 3 so that an imaging device 317 in the defect detecting device 303 can pick up an in-focus image of light transmitted by an optical lens 314g. Incidentally, in this case, an image having an appropriate brightness is obtained by epi-illumination by half-silvered mirrors 315a and 315b, an optical lens 314a, and a lamp 309. The picked-up image including the defective part (defect image) is temporarily stored in a defect image memory 318. The pixel in this case corresponds to a defective wiring section 2a shown in FIG. 1.

Next, the control device 301 sends a command to the stage control device 307 to move the XY stage 305 so that the position of exactly the same pixel pattern as that of the pixel having the defective part is directly below the objective lens 308. Then, an image without a defect (reference image) is picked up, and stored in a reference image memory 319. The pixel in this case corresponds to a wiring section 2 shown in FIG. 1.

A defect extracting section 320 extracts an image of the defective part by generating a difference image (defect region image) after aligning the defect image stored in the defect image memory 318 and the reference image stored in the reference image memory 319 with each other. The defect extracting section 320 then outputs the extracted image of the defective part to a detailed positional information extracting section 321 and a feature extracting section 322. Incidentally, the difference image (defect region image) is also output to the control device 301.

The detailed positional information extracting section 321 calculates an accurate position of the extracted defect on the substrate 3 from the present position of the XY stage 305 and the defect image. The detailed positional information extracting section 321 sends the information to a correcting method generating section 326.

The feature extracting section 322 converts various kinds of feature information such as the color, size, contrast, shape and the like of the defect, which feature information is information for identifying the form, type and the like of the defect extracted by the defect extracting section 320, into numerical values. The feature extracting section 322 outputs the numerical values to the control device 301.

Then, the control device 301 reads defect correcting information (repair recipe information) to be described later in detail from a correcting method database 325 on the basis of the detailed positional information and the feature information obtained from the detailed positional information extracting section 321 and the feature extracting section 322. This defect correcting information defines the operation of each unit in a correcting mechanism section 304 in the defect correcting device 302.

Specifically, for example, the control device 301 determines in which position and state the defective part is present in the wiring substrate and what layer information is included for the defective part on the basis of the detailed positional information from the detailed positional information extracting section 321, and performs control such that a defect correcting process suitable for the position of the defect is performed.

The layer information is the information of individual layers forming the multilayer substrate. The layer information includes for example layer IDs indicating order in which the layers are laminated, layer names, and the number of labels within a layer. There is also label information indicating information on individual regions (labels) forming the corresponding layers. The label information includes label IDs for identifying labels within the corresponding layers and layer IDs indicating the layers including the corresponding labels.

Further, as will be described later in detail, the control device 301 displays a correcting method (template (repair object)) based on the generated defect correcting information in a state of being superimposed on the defect image on the display 327. Incidentally, the control device 301 has a function of correcting (optimizing) a part of the repair object of the defect correcting information to be described later on the basis of the defect information such as the position, features and the like according to conditions. In addition, one piece of defect correcting information may include a plurality of correcting methods.

When an operator views the correcting method displayed on the display 327 and determines that there is a problem, the operator can for example select another correcting method by operating the input device 328 (input section) such as a keyboard, a mouse or the like, or change a part or the whole of the correcting method (defect correcting information). Further, when a plurality of defect correcting methods are read from the correcting method database 325, the plurality of defect correcting methods are displayed on the display 327 to prompt the operator for selection. Then, defect correction is made according to a defect correcting method selected by the operator by operating the input device 328.

When the control device 301 receives an operating signal input from the input device 328, the control device 301 records a history of selections and changes of defect correcting methods in the correcting method database 325. The correcting methods stored in the correcting method database 325 are used for a next and subsequent defect corrections.

When a defect correcting method is determined, the control device 301 sends a command to the correcting mechanism control device 316 to operate each unit within the correcting mechanism section 304 and correct the defect according to the defect correcting method. The correcting mechanism section 304 is configured to be able to change an irradiation size and an irradiation angle by correcting a laser beam applied from a laser light source 313 in optical lenses 314b and 314c and thereafter making the laser beam pass through a variable slit 312.

Suppose that the variable slit 312 is for example an XY-θ slit, which can change opening lengths in an X-direction and a Y-direction of a rectangle and an angle of rotation θ, and can be driven by a driving signal from the correcting mechanism control device 316.

The laser beam adjusted in irradiation shape by the variable slit 312 is transmitted by an optical lens 314d, and reflected by galvanometer mirrors 311a and 311b. The galvanometer mirrors 311a and 311b are mirrors whose angle can be changed two-dimensionally. By driving the galvanometer mirrors 311a and 311b under control of the correcting mechanism control device 316, the optical axis of the laser beam, that is, an irradiation position can be adjusted within the field of view of the objective lens 308 without the XY stage 305 being moved.

The defect correcting apparatus 300 including such a variable slit 312 and such galvanometer mirrors 311a and 311b can irradiate the defect with the laser beam or the like with sufficient positional accuracy, and thus correct pattern defects accurately.

Then, the laser beam reflected by the galvanometer mirrors 311a and 311b is transmitted by different kinds of optical lenses 314e and 314f, reflected by the half-silvered mirror 315a, and thereafter applied to the substrate 3 via the objective lens 308, so that defect correction is made.

The above-described defect inspecting apparatus 400 can use an optical inspecting machine as a method for searching for defects, thus enabling correction of a pattern defect whose conduction state is normal.

The control device 301 will be described in more detail.

FIG. 6 is a block diagram showing an internal configuration of the control device 301. The control device 301 includes an input-output section 351, an image processing section 352, a defect determining section 353, a repair object generating section 354, an enclosure zapping optimizing section 355, a repair object determining section 356, a comment generating section 357, a template selecting section 358, a repair removal area calculating section 359, and a memory 360.

The input-output section 351 receives information input from the outside and outputs information to the outside. The image processing section 352 performs image processing such as image synthesis, which synthesizes a wiring pattern image and a repair object, for example, binarization, and the like. The defect determining section 353 determines the type, position, region, size and the like of a defect from a defect image and a reference image (conforming item image) in a simple manner. The repair object generating section 354 generates a repair object in an enclosure zapping form or a stationary zapping form. The enclosure zapping optimizing section 355 optimizes a repair object in the enclosure zapping form according to the position, size, and the like of the defect region.

Further, the repair object determining section 356 determines an effect of an automatically generated repair object on the circuit of the repetitive pattern, for example whether or not the repair object overlaps an illegal region or whether or not the repair object causes a break. The comment generating section 357 generates the contents of a comment to be displayed on the display 327. The template selecting section 358 selects an optimum template when the defect determining section 353 determines that the defect region does not overlap a node region where a leak defect may occur. The repair removal area calculating section 359 calculates the removal area of all of automatically generated repair objects among candidates for repair objects to be used for correction. The memory 360 is an internal memory. Nonvolatile storage means such as a semiconductor memory, for example, is applied to the memory 360. Details of functions and operation of each processing section will be described later.

[Defect Correcting Process]

Figure 7:
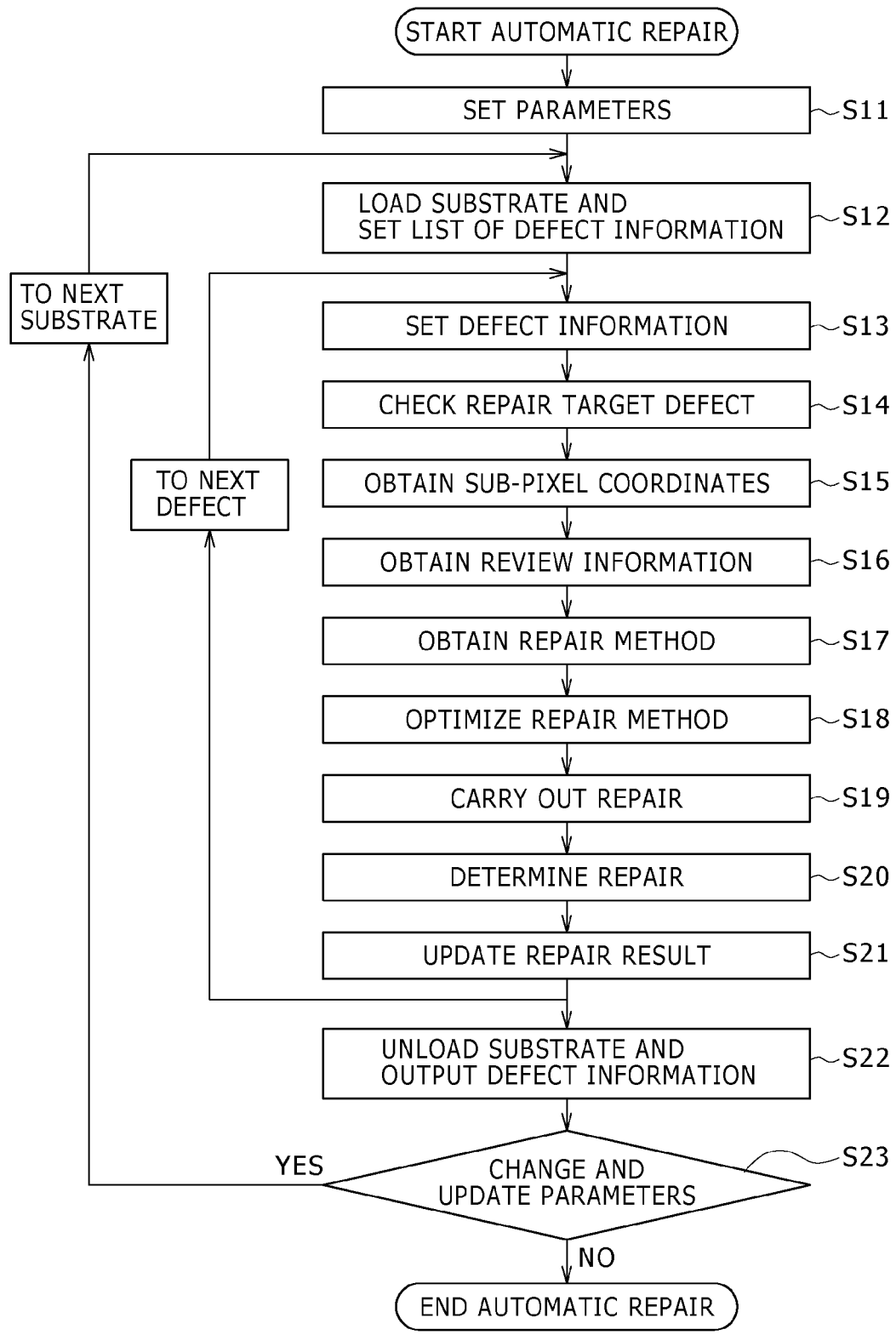
FIG. 7 is a flowchart of a defect correcting process according to an embodiment of the present disclosure.

A series of operations of a defect correcting system formed of the above-described configuration will be described in relation to the defect correcting process by the defect correcting apparatus 300. FIG. 7 is a flowchart showing a main routine of the defect correcting process.

Step S11: Parameter Setting

An initialization setting of the defect correcting apparatus 300 is performed. That is, basic information for making correction is set in the defect correcting apparatus 300.

Parameters are specifically basic information (device information) relating to the substrate 3, such as the number and arrangement of wiring sections 2, the number and arrangement of patterns, the positions of alignment marks, and the like within the substrate 3 as a target of correction. In addition, parameters are the size and conditions of a defect as a target of automatic correction, correction condition setting information such as the number of corrections made within the substrate 3, the feature of a defect to be given priority, and the like, the shape of a wiring pattern, a correcting method database to be applied (applicable in a case of a plurality of databases), and the like. These parameters to be set uniquely in the defect correcting apparatus 300 are set.

Step S12: Bringing in Substrate 3 and Setting Input Information

The substrate 3 is brought into the defect correcting apparatus 300 from the outside, and defect information for preprocessing of the substrate 3 is input. Information on the substrate 3 brought into the defect correcting apparatus 300 and the defect information are compared with the parameters set within the defect correcting apparatus 300, basic information on the substrate 3 as a target of correction is determined, and initial settings of correction conditions (for example clearing the number of correction processes) are made.

The defect information is either the number and coordinates of defects detected by optical inspection in the defect inspecting apparatus 400 or the pixel information of defects detected by electric inspection (including information indicating line defects or dot defects). Alternatively, the defect information is obtained by associating the defects detected by the electric inspection with the defects detected by the optical inspection.

Step S13: Setting Defect Information

One piece of defect information is input from a list of the defect information for each substrate 3 described above in one of a method of making correction in order from the top of the list, a method of sorting specific defects (for example giving priority to line defects, for example) and making correction collectively, and a method of an operator of the defect correcting apparatus 300 selecting an arbitrary defect.

Step S14: Checking Defect Information

Whether automatic correction can be made from the list of the input defect information of the substrate 3 is checked. That is, there is a case where an automatic correction process cannot be made with only the input defect information, and this is checked.

There is a possibility that automatic correction cannot be made when the correction conditions of the present substrate 3 are not met, as in a case where a specified number of dark dot formation processes or more have been performed, a case where a specified number of correction processes or more have been performed, and a case where a defect has already been subjected to a correction process, for example. In addition, there is a possibility that automatic correction cannot be made in a case where the input coordinates of a defect are indefinite or a case where a clear definition indicating that correction is not to be made is given at a position on the outside of a pattern or the like. Details of such conditions are shown in FIG. 4 and the like of Japanese Patent Laid-Open No. 2008-155263 previously filed by the present applicant, for example.

Step S15: Obtaining Defect Position Information

When it is determined that the input defect information represents a defect to be corrected, detailed coordinate information of the defect is obtained. Specifically, a position where the defect is actually present is calculated from defect coordinates of a result of optical inspection, a pixel number of a result of electric inspection, or the like. Incidentally, this step S15 is described as "OBTAIN SUB-PIXEL COORDINATES" in FIG. 7.

Step S16: Taking Defect Image

After the detailed position of the defect is calculated, the XY stage 305 is moved, and a defect image is taken to obtain detailed defect information within the repetitive pattern. For details, see Japanese Patent Laid-Open No. 2007-163892 and Japanese Patent Laid-Open No. 2008-159930 previously filed by the present applicant. Incidentally, this step S16 is described as "OBTAIN REVIEW INFORMATION" in FIG. 7.

Step S17: Obtaining Defect Correcting Method

The detailed defect information obtained from the defect image is compared with defect correcting methods, and an optimum defect correcting method is retrieved from the correcting method database 325 and output together with the position information of the defect. For details, see for example Japanese Patent Laid-Open No. 2008-159930, Japanese Patent Laid-Open No. 2009-251200, and Japanese Patent Laid-Open No. 2010-102050 previously filed by the present applicant.

Step S18: Optimizing Defect Correcting Method

The adjustment of an area of application of the defect correcting method (repair object) to be applied to the defect as a target of correction, processing size and the like as well as adjustment such as rearrangement of the order of making corrections is made. A result of the adjustments is stored in the memory 360, the correcting method database 325, or the like. The optimization of the defect correcting method will be described later.

Step S19: Process of Performing Correction

The defect correcting method is set according to the position of the actual defect, a positional correction is made as required, and thereafter correction is performed. A result of performing the correction at this time is separately stored in the memory 360, the correcting method database 325, or the like. At this time, a technique for defect correction as described in Japanese Patent Laid-Open No. 2007-281376 can also be used.

Step S20: Correction Determining Process

After the performance of the correction is completed, the substrate after the correction is photographed at the same coordinates and magnification as in the position where the defect image was taken, and the images are compared with each other. Thereby a simple determination is made as to whether an appropriate correction has been completed.

Step S21: Correction Result Updating Process

A correction result is updated. Updated contents are a determination as to whether correction has been made properly, detailed correction contents, the number of correction processes, the number of dark dot formation correcting processes, and the like. After the correction result is updated, the list of the defect information is checked again to determine whether there is an unprocessed defect or whether to end correction, and a determination is made as to whether to continue the correction process by inputting next defect information or whether to end correction and take out the substrate 3. When it is determined in step S21 that there is an unprocessed defect, a return is made to step S12.

Step S22: Taking Out Substrate and Setting Correction Information

After all defects of the loaded substrate 3 have been corrected or after a correction ending condition is satisfied, the substrate 3 is taken out, and defect correction information is output to the defect information managing system 12. The correction ending condition is the performance of a specified number of corrections or more, the performance of a specified number of dark dot formation corrections or more, the completion of correction of specific defects, or the like.

Step S23: Parameter Update

When a new defect correcting method is registered in the processes described above, or when the conditions of defects to be corrected or a correcting method such as laser light power or the like needs to be changed, for example, the parameter information set in the correcting method database 325 of the defect correcting apparatus 300 is updated, and a next substrate 3 is set.

Figure 8:
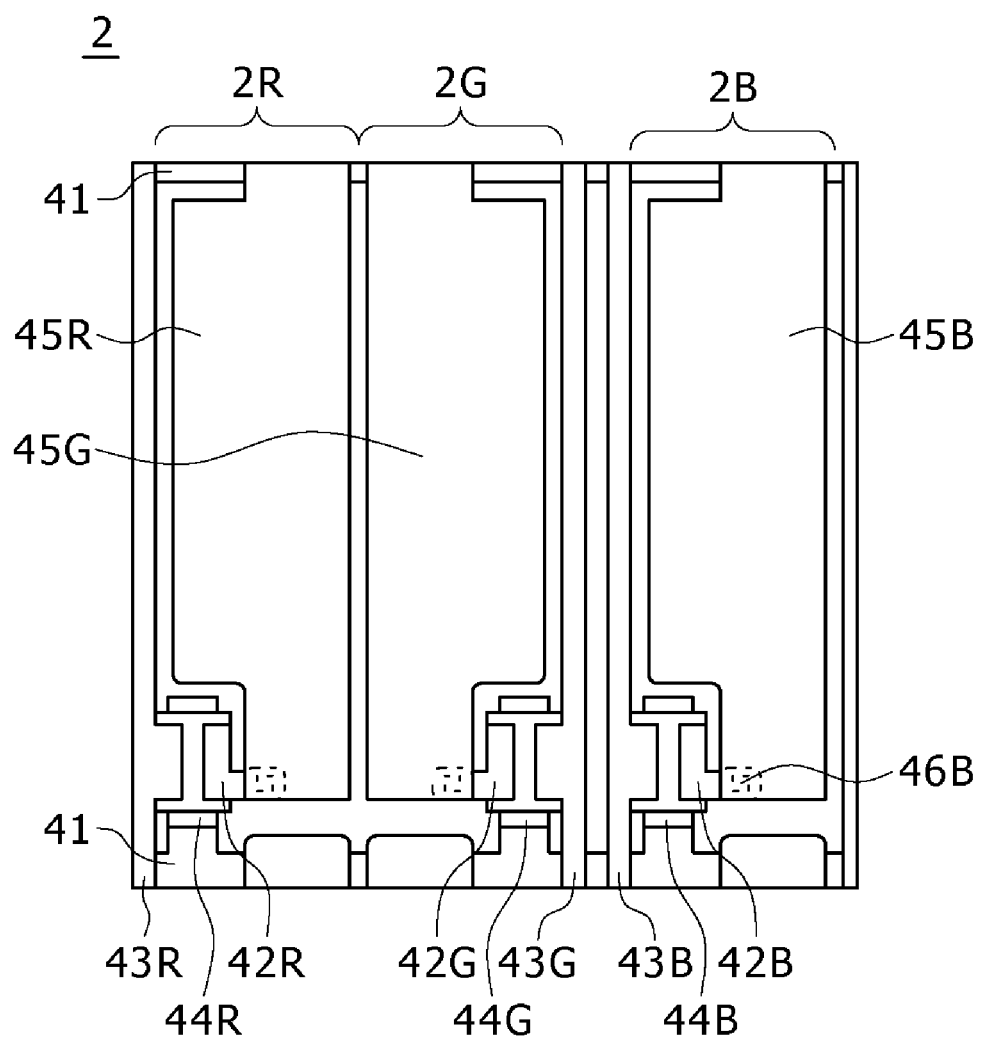
FIG. 8 is a diagram showing an example of a repetitive pattern (wiring section)

FIG. 8 shows a schematic configuration of a wiring section 2 (unit pixel) formed in the repetitive pattern area 6 of a wiring substrate 1.

The wiring section 2 is divided into sub-pixels of respective colors which sub-pixels form the unit pixel, or for example three regions (hereinafter referred to also as "sub-areas") 2R, 2G, and 2B corresponding to three primary colors R, G, and B. The three sub-areas 2R (2G and 2B) have structures different from each other in that the three sub-areas have different capacitors (capacitance elements) 45R (45G and 45B). In the present embodiment, the three sub-areas 2R (2G and 2B) having shapes (structures) partly different from each other will be described as an example. However, these sub-areas may of course have shapes (structures) identical to each other.

Each sub-area 2R (2G or 2B) is formed in substantially a same size. Signal wiring 42R (42G or 42B), potential supplying wiring 43R (43G or 43B), and a ground electrode (not shown) are arranged on scanning wiring 41 provided on the wiring substrate 1 so as to extend in a direction orthogonal to the scanning wiring 41 with an interlayer insulating film (not shown) interposed between the scanning wiring 41 and the signal wiring 42R (42G or 42B), the potential supplying wiring 43R (43G or 43B), and the ground electrode. The signal wiring 42R (42G or 42B) is opposed to the capacitor 45R (45G or 45B) not shown in the figure which capacitor is connected to the ground electrode with the gate of a TFT element 44R (44G or 44B) interposed between the signal wiring 42R (42G or 42B) and the capacitor 45R (45G or 45B).

Incidentally, the wiring pattern of the wiring section 2 shown in FIG. 8 is merely a schematic representation of an actual wiring pattern. It is thus to be noted that the wiring pattern of the wiring section 2 shown in FIG. 8 may be different from the actual wiring pattern.

Assuming that a correction pattern in the wiring pattern (wiring section 2) having the repetitive pattern as shown in FIG. 8 can be divided into a plurality of correction patterns according to defect positions within the pixel, a correcting method to be applied may differ according to the conditions. In this case, information on which defect correcting method is used for defects of which condition is registered as a template in the correcting method database 325 in advance. The template is a result of converting defect correcting information (repair recipe information), that is, a defect correcting method into an object (visualization).

A method of retrieving an optimum defect correcting method from the correcting method database 325 by inputting the position of a defect and the reference coordinates of the repetitive pattern (wiring section 2) and applying the defect correcting method in a state of being superimposed on a defect image, for example, is effective. A technique described in Japanese Patent Laid-Open No. 2007-163892, for example, can be applied as a defect correcting method using such a template.

Figure 9:
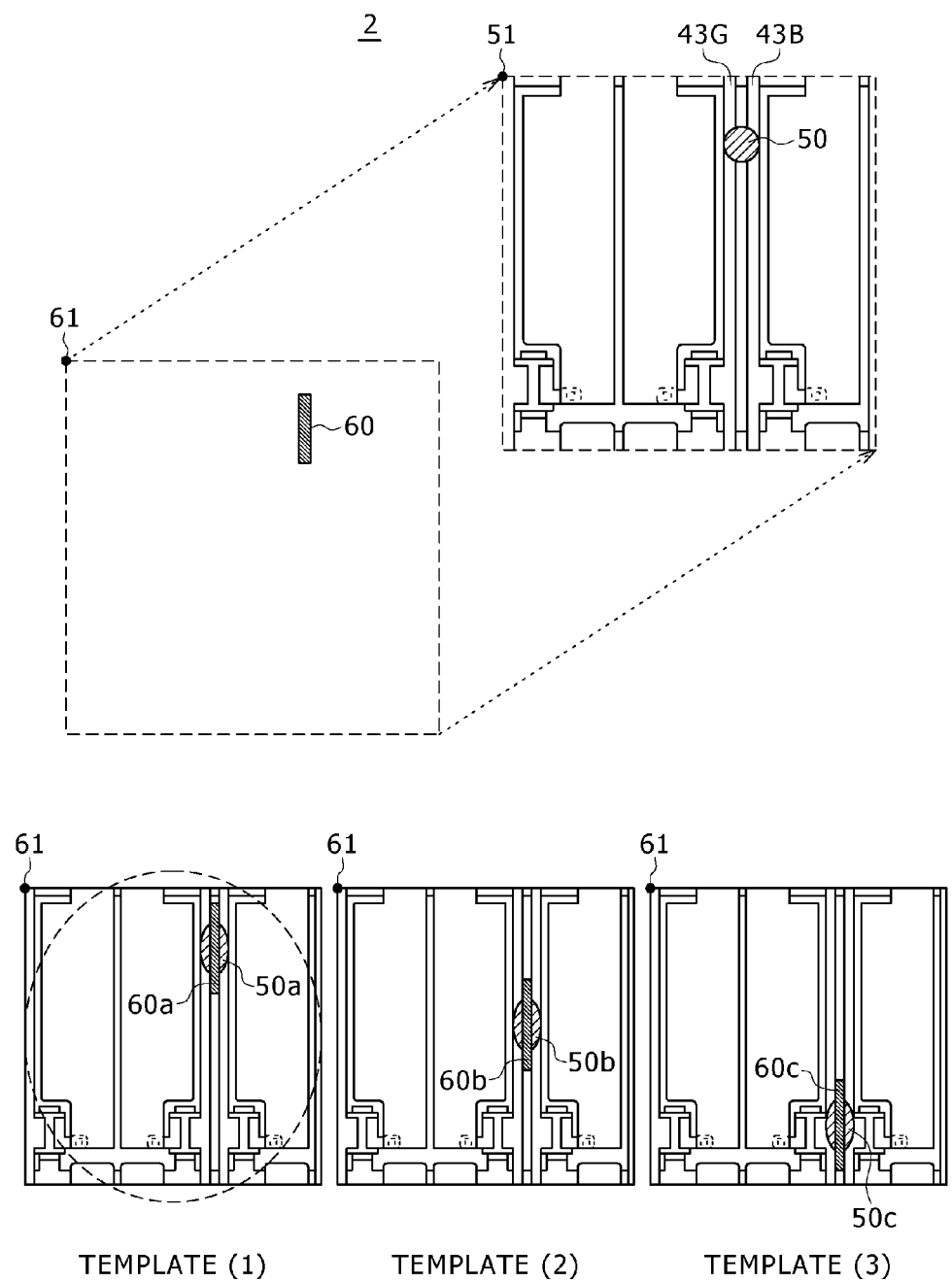
FIG. 9 is a diagram showing an example of a defect image and templates.

FIG. 9 shows an example of a defect image of a short-circuit defect present in a wiring part and an applied template.

The defect 50 within the defect image is an example of a short-circuit defect in a wiring part (potential supplying wiring 43G and 43B). First, the detailed positional information extracting section 321 detects the reference coordinates 51 set at one corner of the wiring section 2 and a repetitive pattern region 52. Further, the position and conditions of the defect 50 on the repetitive pattern are narrowed down on the basis of a relative position from the reference coordinates 51. Then, the control device 301 selects a registered template suitable for the conditions of the defect 50 from the correcting method database 325.

A template includes a "defect object" imitating a defect and a "repair object" indicating a part where a correction process is applied according to the position of the defect object and the feature of the defect object on the wiring section. The defect object indicates the position of the defect object, a region to which the defect object belongs, the scale of the defect object, the shape of the defect object, a circuit in which the defect object is situated, and the like. The repair object indicates the position of laser light irradiation corresponding to the defect, the power of the laser light irradiation, and the like.

In this example, suppose that optimum templates (1) to (3) are registered in the correcting method database 325 as defect correcting methods for the defect 50 that causes a short (short circuit) between the pieces of wiring, that is, for defect objects 50*a*, 50*b*, and 50*c*, respectively.

That is, the templates (1) to (3) are registered in the correcting method database 325 as defect correcting methods corresponding to the position of the defect 50. A template most suitable for the correction of the defect 50 is selected from the templates (1) to (3).

The template (1) has a repair object 60*a* for the defect object 50*a* whose position and conditions such as size and the like are substantially the same as those of the defect 50. In addition, the template (2) has a repair object 60*b* for the defect object 50*b* situated slightly below the defect 50. Further, the template (3) has a repair object 60*c* for the defect object 50*c* situated far below the defect 50.

In this case, the template (1) having the defect object 50*a* whose position and conditions such as size and the like are close to those of the defect 50 is selected as an optimum template for the correction of the defect 50.

Then, the template output to the control device 301 is displayed on the display 327. At this time, the repair object 60*a* is superimposed on the defect 50 of the defect image by performing a coordinate transformation of the reference coordinates 61 of the template (1) with the reference coordinates 51 of the defect image (wiring pattern) as an origin. A method for the coordinate transformation is described in more detail in Japanese Patent Laid-Open No. 2008-159930, for example.

According to the defect correcting method in such a repetitive pattern area, an optimum template can be selected on the basis of the position, size, and type of the defective part within the repetitive pattern (wiring section). Thereby, a defect correcting process can be automated by reading the defect correcting method selected so as to correspond to positional relation, and the trouble of making distinctions by a human can be avoided.

In the disclosure of the present application, a defect correcting method for an interlayer short-circuit defect, which is difficult to correct by a defect correcting method that compares a defect region with registered templates and which obtains a corresponding template, is further generated automatically and obtained by a method different from "registration." Incidentally, in the following embodiment, because of frequent use of image processing, a coordinate system has an origin at an upper left, a horizontal direction is set as an X-direction and a vertical direction is set as a Y-direction, and a direction of rotation is a counterclockwise direction. However, the disclosure of the present application is not limited to this example. In addition, a region in which a defect is present (which is occupied by a defect) within the repetitive pattern will also be referred to specifically as a "defect region" or a "defect area."

Incidentally, when there is no defect correcting method (template) corresponding to and appropriate for a defect as a target at a time of readout of a correction procedure from the correcting method database 325, a second best template is selected on the basis of predetermined priority or the like. The template of a defect correcting method having highest priority or for example used with a high frequency, the template of a defect correcting method with a low degree of correction difficulty, or the like is selected automatically, and displayed on the display 327. Then, a correcting method based on the displayed template is carried out automatically, or carried out after being visually checked by an operator.

In addition, when there is no processing setting file (template) applicable to a defect as a target, the operator can set a laser processing condition manually by operating the input device 328, and further the setting file can be added to the correcting method database 325.

[Header Information and Object Information]

A defect correcting method displayed as a template in the present embodiment is a data file having header information and object information associated with the header information (for details, see Japanese Patent Laid-Open No. 2007-163892). Incidentally, this defect correcting method will be referred to also as "defect correcting information (repair recipe information)."

The header information includes a "recipe name (or a recipe number)" of a defect correcting method, a "region number" indicating a sub-area (region) having a defect, a "sub-region number" indicating a sub-area, a "reference pixel number" indicating the position of a reference pixel on the substrate 3, "adjacent pixel numbers" indicating the presence or absence and the positions of adjacent pixels above and below the reference pixel and on a left and a right of the reference pixel, and an "object count" of repair objects indicating defects and defect correcting methods that are registered as recipes.

The object information includes a "defect object" imitating a defect and a "repair object" indicating a part where a correction process is applied according to the position of the defect object and the feature of the defect object on the wiring section 2.

That is, object information is defect objects and repair objects associated with each other and registered, the defect objects and the repair objects being equal in number to the object count registered in the header information. Incidentally, a simple expression "registration" refers to registration in the correcting method database 325 described above.

The above-described object information includes a "recipe name (or a recipe number)" to be checked against a recipe header, "coordinates" indicating the position of an object within the wiring section 2, an "object shape," an "angle," and "position correcting information" as basic information. The basic information is provided for both the defect object and the repair object.

Incidentally, the "correcting information" is information for position correction by comparison with the position of a defect in an actual defect image. The "angle" is an angle of rotation from the regular position of the defect on the XY stage 305 described above.

In the disclosure of the present application, the size of a defect correcting method (repair object) within a registered template is further optimized to a size with which the defect correcting apparatus can perform processing before actual processing on the basis of the position, size, and type of the defect present within the repetitive pattern (wiring section 2). Thereby, problems in defect correction due to the correction specifications of a different defect correcting apparatus and a difference in specifications are eliminated. In addition, displaying a state of actual template optimization in an image enables visual checking for an error in template registration or the like.

[Region Information (Layer Structure)]

Figure 10:
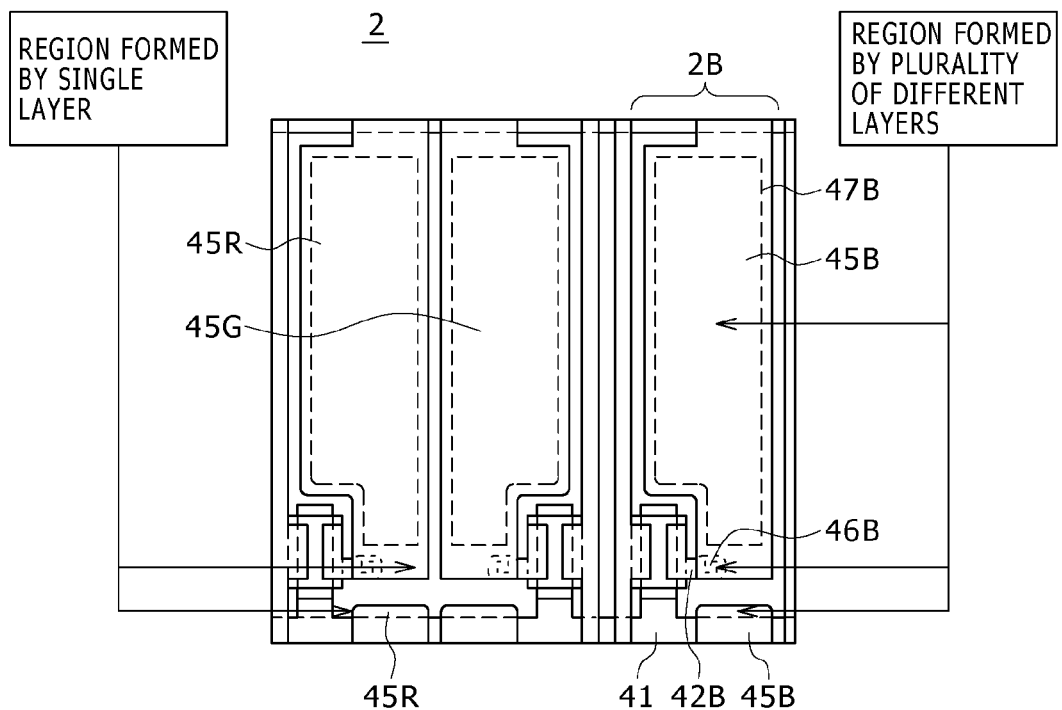
FIG. 10 is a perspective view of the layer structure of the repetitive pattern shown in FIG. 8.

FIG. 10 is a schematic perspective view of the layer structure of the repetitive pattern (wiring section 2) shown in FIG. 8.

The wiring section 2 is of a multilayer structure. Thus, another layer may be present under a particular layer, and a defect causing a short circuit between an upper layer and a lower layer different from each other (interlayer short-circuit defect) may occur. Taking the sub-area 2B as an example, a region 47B (node region) in which an upper layer and a lower layer forming the capacitor 45B are laminated, a part connected to a contact hole 46B, a part where the capacitor 45B overlaps the scanning wiring 41, and the like correspond to regions formed by a plurality of different layers.

Figure 11:
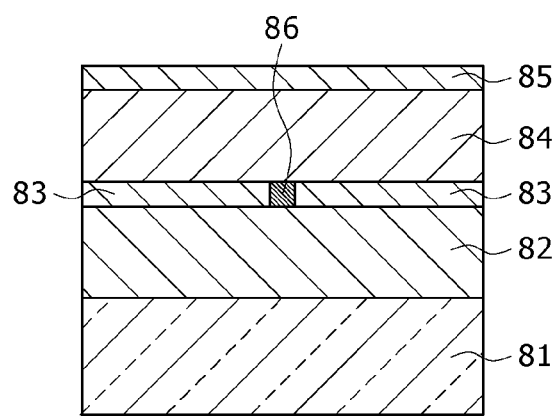
FIG. 11 is a sectional view of an example of a leak defect (interlayer short-circuit defect)

FIG. 11 is a sectional view of an example of a leak defect (interlayer short-circuit defect).

An example shown in FIG. 11 is a wiring substrate having a multilayer structure in which a wiring layer 82 is laminated on a glass substrate 81, a wiring layer 84 is further laminated with an insulating layer 83 interposed between the wiring layer 82 and the wiring layer 84, and a protective layer 85 is formed as an uppermost layer. In the wiring substrate, a leak defect 86 occurs between the wiring layer 82 as a lower layer and the wiring layer 84 as an upper layer, causing an interlayer short circuit.

Figure 12:
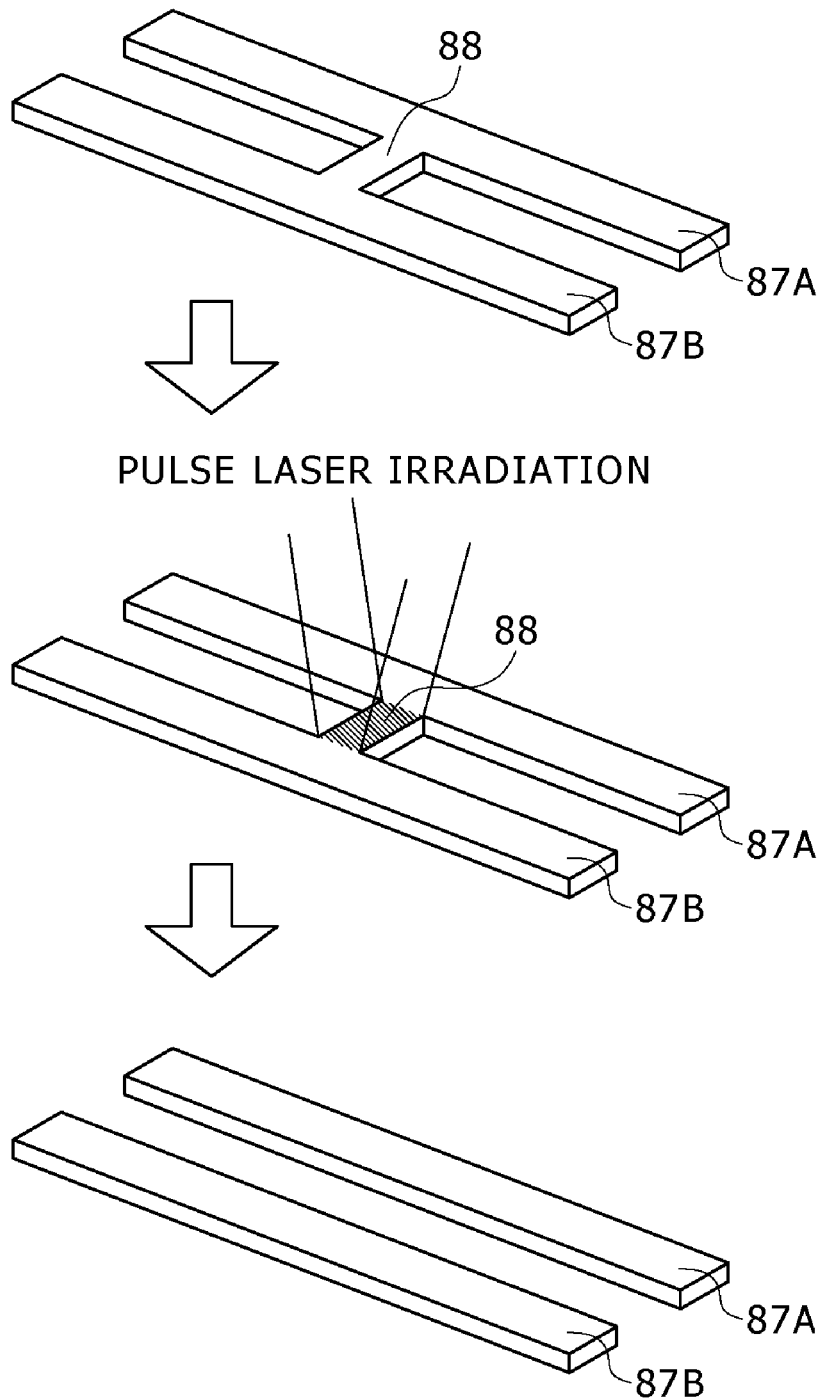
FIG. 12 is a diagram of assistance in explaining defect correction for a same-layer short-circuit defect by zapping in the past.

FIG. 12 is a diagram of assistance in explaining defect correction for a same-layer short-circuit defect by zapping in the past.

A short-circuit part 88 (top of FIG. 12) connecting two pieces of wiring 87A and 87B is irradiated with a pulse laser (middle of FIG. 12). Thereby, the short-circuit part 88 is removed, and the same-layer short-circuit defect between the wiring 87A and the wiring 87B is corrected (bottom of FIG. 12). However, it is difficult to repair an interlayer short-circuit defect as in FIG. 11 by the method for correcting a same-layer short-circuit defect by zapping in the past as shown in FIG. 12.

Figure 13:
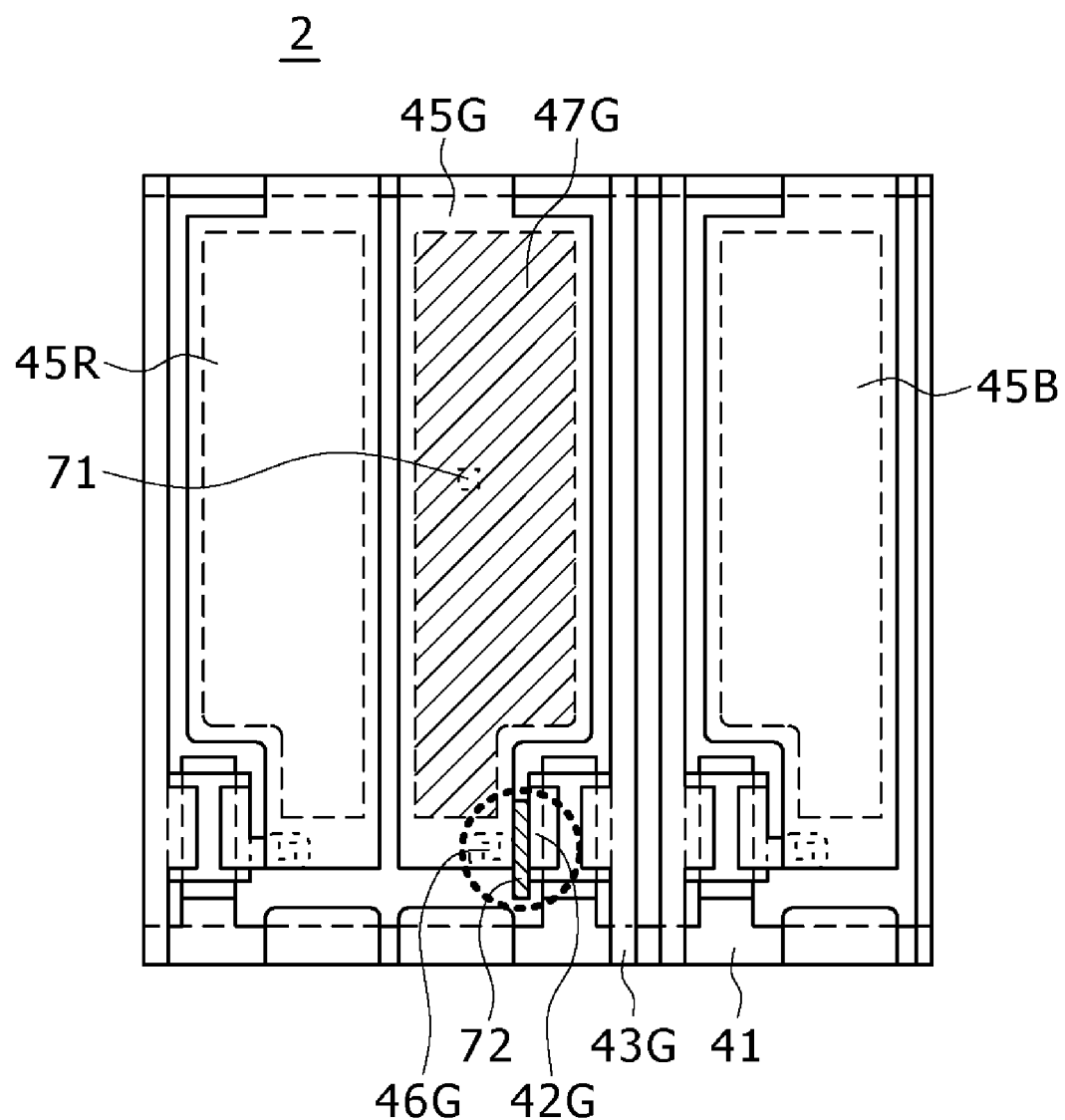
FIG. 13 is a diagram of assistance in explaining correction of a same-layer short-circuit defect by using a template.

FIG. 13 is a diagram of assistance in explaining correction of a same-layer short-circuit defect by using a registered template.

This example shows a template (repair object 72) for breaking a part of the capacitor 45G in which a leak defect 71 has occurred and thereby insulating the capacitor 45G from the signal wiring 42G. As in the example of the repair object 72 shown in FIG. 13 for the capacitor 45G, zapping (repair object 72) in a same layer can be performed for an area of occurrence of an interlayer short-circuit defect.

However, when a template is used, a direct approach to the region where the defect has occurred cannot be made, and therefore the correcting method often renders all the short-circuited region ineffective. Thus, when an interlayer short circuit or the like in a capacitor region occupies a large area within the repetitive pattern, a dark dot is formed in the part of occurrence of the defect (a sub-pixel or a pixel), consequently involving a degradation in quality of the substrate.

A method for making a direct approach to a region where an interlayer short circuit has occurred in order to solve the above problem is described as an example in Japanese Patent Laid-Open No. 2007-281376. A method for repairing an interlayer short circuit according to an embodiment of the disclosure of the present application on the basis of the above method is proposed as follows.

Figure 14A:
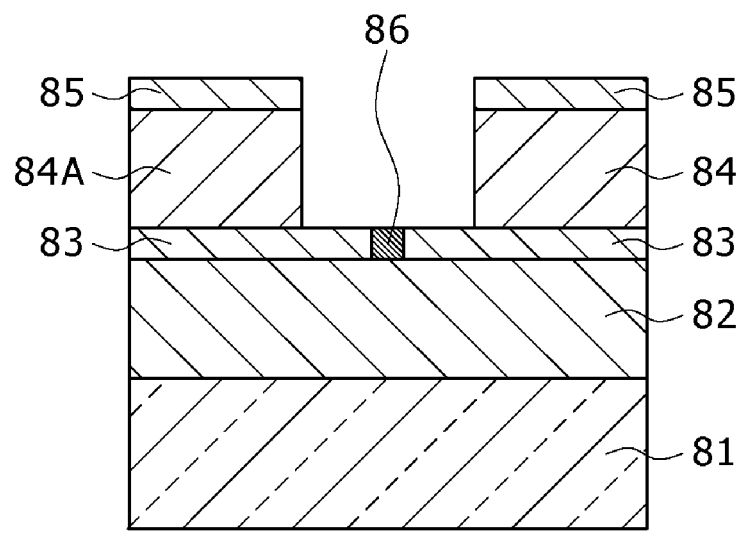
FIGS. 14A and 14B are diagrams of correcting methods for an interlayer short-circuit defect, FIG. 14A representing a case of correction by upper-layer zapping, and FIG. 14B representing a case of correction by all-layer zapping.
Figure 14B:
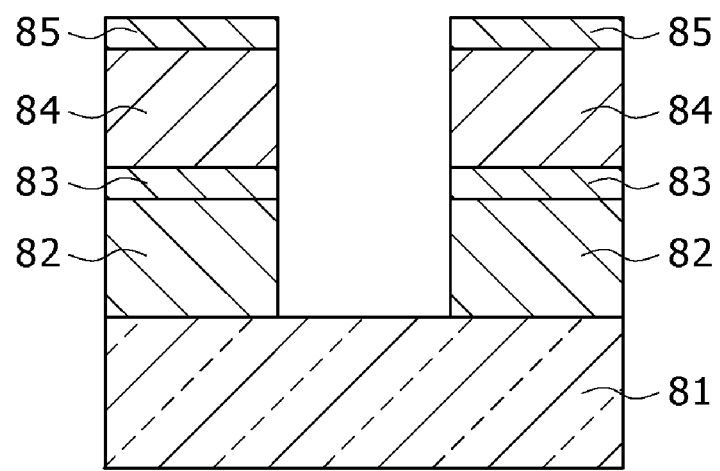

FIGS. 14A and 14B are diagrams of correcting methods for the wiring substrate having the interlayer short-circuit defect in FIG. 11. FIG. 14A represents a case of correction by upper-layer zapping. FIG. 14B represents a case of correction by all-layer zapping.

The upper-layer zapping in FIG. 14A is a method of selectively removing only the wiring layer 84 on the insulating layer 83 in which the short circuit has occurred. The all-layer zapping in FIG. 14B is a method of removing target regions of both the wiring layer 84 as an upper layer and the wiring layer 82 as a lower layer together with the leak part (leak defect 86) of the insulating layer 83. The correcting methods of FIG. 14A and FIG. 14B are realized by changing, as it were, the depth of laser irradiation.

Description will be made further of an example in which a laser irradiation region is changed selectively for a region having a defect.

Figure 15A:
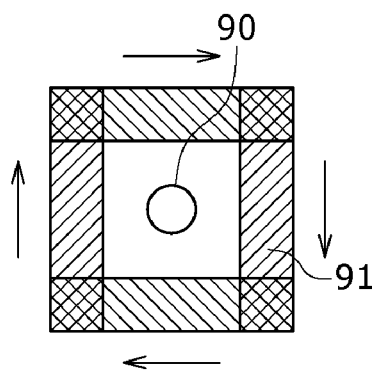
FIGS. 15A and 15B are diagrams of assistance in explaining selections of a laser irradiation region, FIG. 15A representing enclosure zapping, and FIG. 15B representing stationary zapping.
Figure 15B:
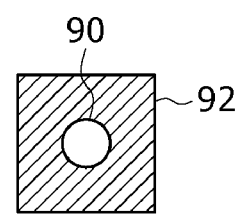

FIGS. 15A and 15B are diagrams of assistance in explaining a laser irradiation region. FIG. 15A represents enclosure zapping. FIG. 15B represents stationary zapping. The "enclosure zapping" scan-processes and removes a region 91 around a leak defect 90. Thus, the defect is not directly irradiated with a laser, but a large area is removed, and the processing takes time. On the other hand, the "stationary zapping" does not take much processing time. However, because the stationary zapping directly applies laser processing to a region 92 including the leak defect 90, the stationary zapping is a processing method that can be carried out on condition that there be a guarantee that a secondary defect will not be caused by splashing the defect region, for example.

Incidentally, suppose that the interlayer short circuit correcting method and the processing region selection represented in FIG. 14A or 14B and FIG. 15A or 15B can be changed arbitrarily according to the size of the defect, the position of occurrence of the defect, and the like. A method for correcting a defect automatically using this correcting method will be described in the following. While the disclosure of the present application proposes a method of correcting an interlayer short-circuit defect of a capacitor section, the part to which the correcting method according to one embodiment of the present disclosure is applied is not limited to a capacitor as long as the interlayer short-circuit defect is that of an interlayer short circuit between a plurality of different layers as an upper layer and a lower layer and as long as the correcting method according to one embodiment of the present disclosure is applicable.

As shown in FIG. 13, an interlayer short circuit in a capacitor region has a large defect occurrence region predicted from electric conduction inspection. It is thus difficult to determine the exact position of occurrence of an actual defect, the area of the actual defect, and the like until a defect image is obtained. Further, a plurality of interlayer short circuits may occur in a same region. Thus, a method of registering a correcting method (repair object) for a defect region in a template in the past is not appropriate for interlayer short-circuit defects.

Accordingly, in the disclosure of the present application, template registration is not performed, but, the leak defect in FIGS. 15A and 15B being regarded as a defect object, a template adjusted to a defect region is generated automatically so as to provide an appropriate repair object for the defect object.

Suppose that a combination of layers and layer labels at specific coordinates within a part of occurrence of a defect or the repetitive pattern region can be obtained for a region in which correction is to be performed by using the generated template by a technique described in Japanese Patent Laid-Open No. 2010-102050. In addition, suppose that the part of occurrence of the specific defect shown in FIG. 13 is defined and registered as a node, and that a region including the part of occurrence of the defect can be set arbitrarily as region information different from layer information. In the example of FIG. 13, a region where two specific layers are laminated in the capacitor 45G, for example, is defined as a node region 47G. Methods of registering the node region include for example combining elements of circuit information of CAD (Computer Aided Design) or the like, reading a circuit image or the like and registering the node region, and freehand drawing of the node region. Suppose that a method of registering the node region can be realized by an arbitrary method.

Suppose that in generating a template automatically, correction is allowed to be performed when a generated repair object satisfies the following conditions.
(1) The repair object does not break wiring.
(2) There is no laser irradiation prohibiting region within the area of the repair object.
(3) A region not directly related to a part where correction is to be made (region of an adjacent sub-pixel, a data line, or the like other than a circuit element in which a node region is defined (such as a capacitor in which an interlayer short circuit occurs or the like)) does not overlap within the area of the repair object.
(4) A decrease in area of the node region (capacitor area or the like) which decrease is caused by the correction does not exceed a specified limit.

Incidentally, also for the laser irradiation prohibiting region, as in registration of an interlayer short-circuit defect occurrence region, suppose that arbitrary laser irradiation prohibiting regions are registered in advance, and that information indicating the presence or absence of a laser irradiation prohibiting region at arbitrary coordinates within a pattern region can be obtained. The definition of a laser irradiation prohibiting region changes depending on circuit configuration. However, a laser irradiation prohibiting region is generally defined as a region in which the characteristics of a circuit element are changed due to a thermal effect of a laser or the like or a region to be connected to a layer above not formed at a time of correction. In a case of a TFT substrate using an organic EL, for example, the former corresponds to a transistor section, and the latter corresponds to an anode electrode connected to an EL element serving as a light emitting section or the like. However, this does not apply when laser irradiation does not affect normal circuit operation even in the transistor section, as in a case where there is a guarantee that the transistor section is not affected by the thermal effect of the laser, for example, or when the effect is very insignificant and is thus negligible.

Figure 16:
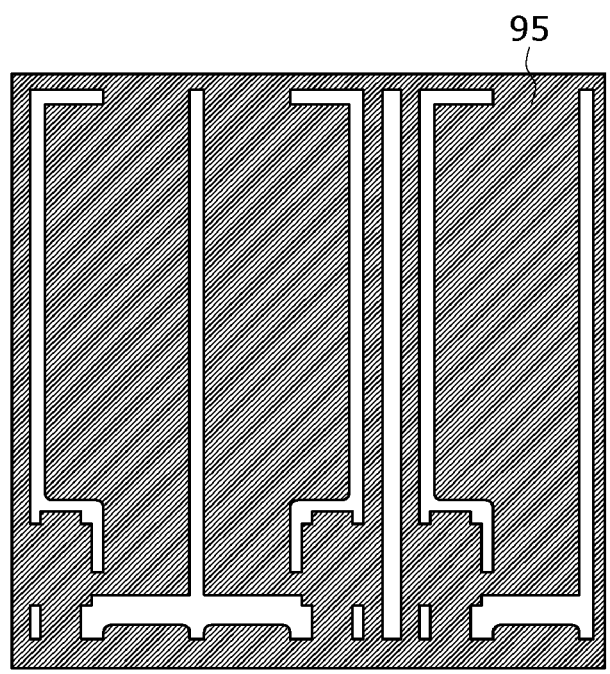
FIG. 16 is a diagram showing an example of labeling regions without layers in an image of the repetitive pattern.

FIG. 16 is a diagram showing an example of labeling regions without layers in an image of the repetitive pattern.

Suppose that regions without any layer can be labeled in the same manner as layer information, and are used for determination of breaks or the like to be described later. In the example of FIG. 16, nine labels can be defined as labels in the background of a region 95 in which some label is present.

Incidentally, the labels of the background can also be used for layer determination shown in Japanese Patent Application No. 2009-239852. For example, when particular labels of the background are connected to each other to form one region, a region of difference from the label of a conforming item pattern represents an open defect (short-circuit defect in the case of layers in the past).

[Defect Correction by Enclosure Zapping]

Description will next be made of a method for generating a repair object in the enclosure zapping form according to the size of the region of an actual defect.

Figure 17:
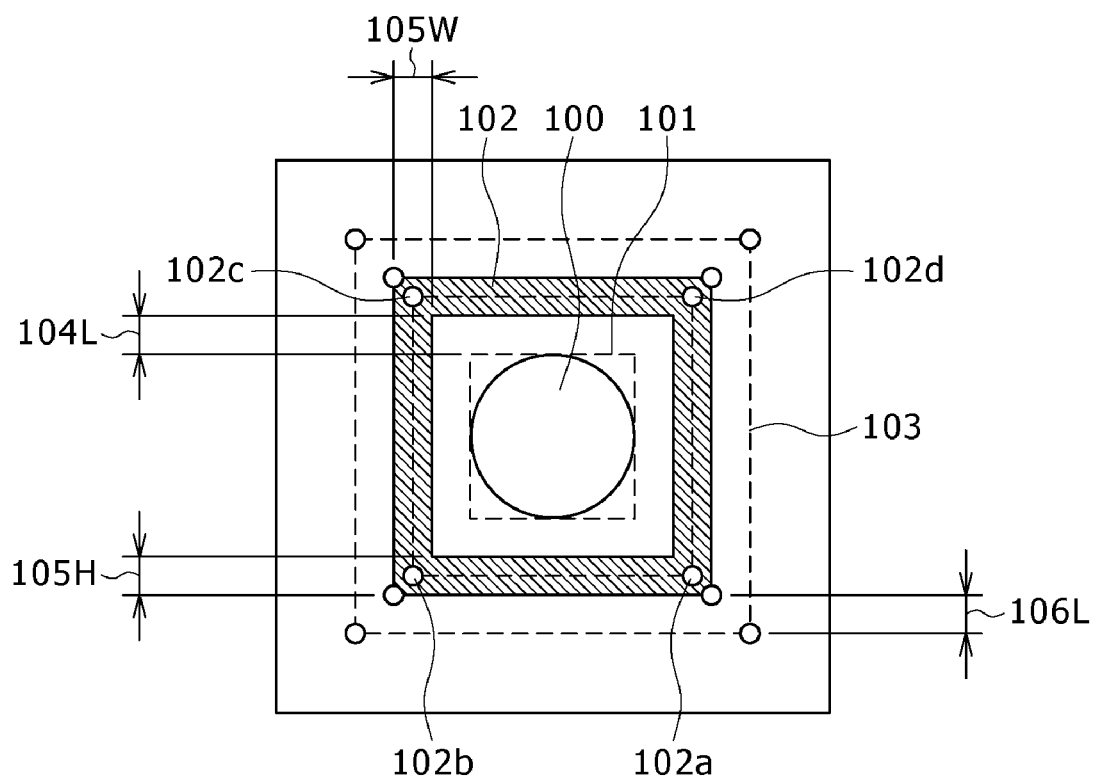
FIG. 17 is a diagram of assistance in explaining an image of the setting of a repair object in an enclosure zapping form and parameters for determining whether the object can be arranged.

FIG. 17 is a diagram of assistance in explaining an image of the setting of a repair object in the enclosure zapping form shown in FIG. 15A and parameters for determining whether the repair object can be arranged. Each of the parameters is defined as follows. The coordinates of a maximum of four vertexes 102a to 102d (ZapTurn) through which a laser irradiation region is passed are set in the repair object 102, and the repair object 102 is arranged so as to enclose a leak defect 100 causing a leak. The width 105W of processing size of a laser will be denoted as "SlitSizeX." The height 105H of the processing size of the laser will be denoted as "SlitSizeY." A rectangle always including two vertexes of the outer perimeter of the repair object 102 will be denoted as "OuterRect." A distance 104L from a quadrangle 101 (DefectRect) circumscribed around the leak defect 100 to the inner perimeter of the repair object 102 will be denoted as "InnerDist." In addition, a shortest distance 106L from the outer perimeter (OuterRect) of the repair object to a laser irradiation prohibiting region over which distance correction is possible will be denoted as "OuterDist." A rectangle separated from the outer perimeter (OuterRect) of the repair object by OuterDist (which rectangle will be referred to also as an "outermost perimeter rectangle") will be denoted as "OuterMostRect."

Suppose in this case that the repair object in the enclosure zapping form takes a form of making a round clockwise from a lower right. However, it suffices to pass all the vertexes from arbitrary starting coordinates and make a round. Correction is made by applying a plurality of lasers having the processing size of SlitSizeX and SlitSizeY on the repair object in one direction. In the present embodiment, the coordinates of the vertexes 102a to 102d that the laser irradiation region passes are arranged according to the following definition when the angle of rotation of the repair object is zero degrees.

StartPos=Starting Position (Lower Right)
ZapTurn[0]=First Turning Point (Lower Left)
ZapTurn[1]=Second Turning Point (Upper Left)
ZapTurn[2]=Third Turning Point (Upper Right)

When the coordinates of the vertexes of the quadrangle (DefectRect) circumscribed around the leak defect 100 are expressed as a combination of DefectRectLeft, DefectRectTop, DefectRectRight, and DefectRectBottom, the coordinates of the vertexes of the repair object 102 are Left=DefectRectLeft−InnerDist−SlitSize$X$/2

Top=DefectRectTop−InnerDist−SlitSize$Y$/2

Right=DefectRectRight+InnerDist+SlitSize$X$/2

Bottom=DefectRectBottom+InnerDist+SlitSize$Y$/2

In this case, the upper left is set as the reference of the coordinate system (see FIG. 9).

Then, the parameters of the repair object 102 (coordinates (X, Y) of the vertexes 102a to 102d that the laser irradiation region passes) can be defined as StartPosX=Right, StartPosY=Bottom
ZapTurn[0].X=Left, ZapTurn[0].Y=Bottom
ZapTurn[1].X=Left, ZapTurn[1].Y=Top
ZapTurn[2].X=Left, ZapTurn[2].Y=Right Thus, the coordinates of the vertexes of the rectangle OuterRect of the outer perimeter of the repair object 102 are obtained by a combination of the following four points.

OuterRectLeft=Left−SlitSize$X$/2

OuterRectTop=Top−SlitSize$Y$/2

OuterRectRight=Right+SlitSize$X$/2

OuterRectBottom=Bottom+SlitSize$Y$/2

Further, the outermost perimeter rectangle OuterMostRect including the shortest distance OuterDist from the laser irradiation prohibiting region to the laser irradiation region is obtained by a combination of the following four points.

OuterMostRectLeft=OuterRectLeft−OuterDist

OuterMostRectTop=OuterRectTop−OuterDist

OuterMostRectRight=OuterRectRight+OuterDist

OuterMostRectBottom=OuterRectBottom+OuterDist

[Determination of Parting of Wiring]

Description in the following will be made of parting of wiring due to an effect of a repair object in the enclosure zapping form.

Figure 18:
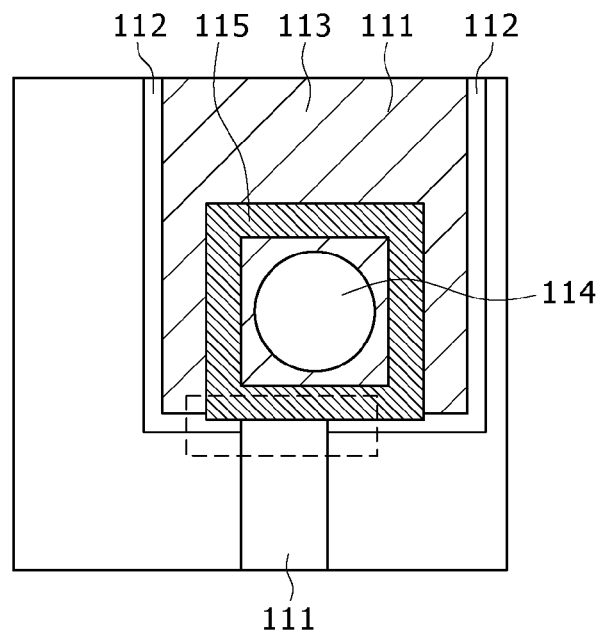
FIG. 18 is a diagram showing an example of parting of wiring due to an effect of a repair object using enclosure zapping.

FIG. 18 is a diagram showing an example of parting of wiring due to an effect of a repair object using enclosure zapping. A region in which a leak defect 114 occurs is a region where a first layer 111 and a second layer 112 overlap each other (node region 113). In conjunction with determination of laser permission settings and determination of parting of wiring, determination is made in an outermost perimeter rectangle OuterMostRect at a certain distance (OuterDist) from the region of a repair object 115 in the enclosure zapping form in consideration of an error in range of effect of laser irradiation. When OuterDist is zero, the outer perimeter (OuterRect) of the repair object 115 forms a region of determination. In the example of FIG. 18, the generated repair object 115 protrudes from the node region 113 where the leak defect occurs or is set very close to an edge of the node region 113, and therefore breaks the first layer 111 connected to another region (part enclosed by a broken line).

Whether wiring is parted can be determined by the repair object determining section 356 of the control device 301 by checking whether there are a plurality of background labels (see FIG. 16) within the area of the outermost perimeter rectangle OuterMostRect as an area of determination or checking changes in elements of layers constituted of individual coordinates when one round of the outermost perimeter rectangle OuterMostRect is drawn (hereinafter referred to as plotting). The concepts of whether the repair object can be set or not and changes of constituent elements in the process of the plotting are as follows.

The repair object can be set when there is no change in all the layer configuration.

The repair object cannot be set when a laser irradiation prohibiting region is detected.

The repair object cannot be set when a plurality of regions of background labels are detected.

The repair object cannot be set when a layer label not present in the node region is detected.

When a configuration of a new combination (a layer when layer types are increased is defined as IN, and a layer when layer types are decreased is defined as OUT) is detected during the plotting, either a flag IN or a flag OUT is set with the changed layer label as a key. When an inversion thereafter occurs in the presence or absence of the layer label as the key (when both IN and OUT are obtained), the flags are counted as one pair. When a layer label already present at a time of a start of the plotting changes in presence or absence, one flag is set for a first time (a flag when the layer label disappears (OUT) and a flag when the layer label occurs again form a pair for the first time). When the number of pairs is one or less, the repair object can be set. When the number of pairs is two or more, it is determined that there is a break, and the repair object cannot be set. (The number of times of change in the presence or absence of a layer label is always an even number. When the number of times of change in the presence or absence of a layer label is an odd number, it is determined that an error has occurred, and the repair object cannot be set.)

As for the obtainment of information on the presence or absence of the laser irradiation prohibiting region, the layer label not present in the node region as a target of determination, and the plurality of background labels, when a method for obtaining the information within the rectangular area of the outermost perimeter rectangle OuterMostRect is already implemented, the method may be used to make determination first. In addition, in a case of deviating from the repetitive pattern in the process of the plotting, a label number changes for an adjacent label. Thus, attention is to be paid when labels are counted.

An example of plotting of an outermost perimeter rectangle when the first layer 111 shown in FIG. 18 is broken will be described with reference to FIG. 19.

Figure 19:
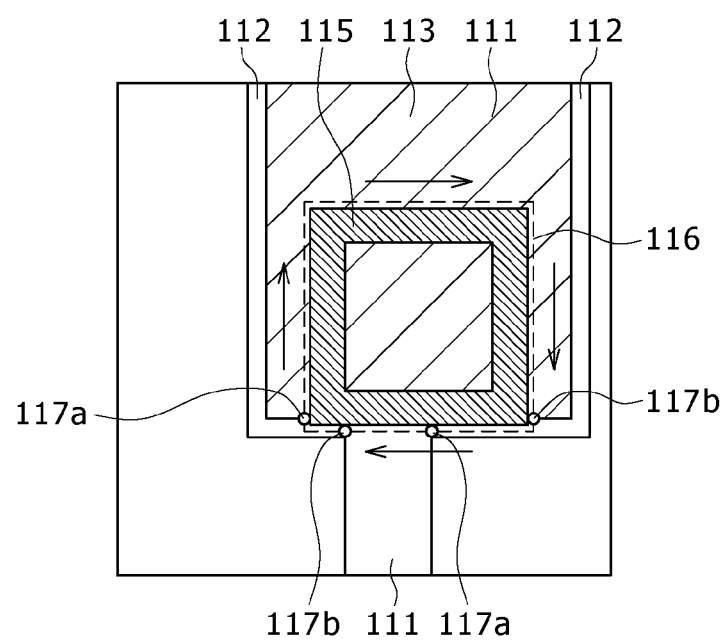
FIG. 19 is a diagram showing an example of determining that wiring is parted on the basis of a plotting line of an outermost perimeter rectangle of a repair object in the enclosure zapping form.

In the example of FIG. 19, parting of wiring is determined on the basis of a plotting line (broken line part) of an outermost perimeter rectangle 116 of the repair object 115 in the enclosure zapping form. Suppose in this case that layer labels present on the outermost perimeter rectangle 116 in a process of plotting one round on the outermost perimeter rectangle 116 in the direction of an arrow are only two types for the first layer 111 and the second layer 112. A change point 117a indicates timing of the first layer 111 appearing on the plotting line. A change point 117b indicates timing of the first layer disappearing from the plotting line.

In the example of FIG. 19, as for the second layer 112, the same layer label is present on the outermost perimeter rectangle 116, and it is thus considered that there is no change of constituent elements. On the other hand, the first layer 111 has parts present on the outermost perimeter rectangle 116 and parts not present on the outermost perimeter rectangle 116, and changes of the respective parts can be counted. On the basis of the above definition, four timings of changing in presence or absence of the first layer 111 (two change points 117a and two change points 117b) can be detected. It can therefore be determined that the first layer 111 is broken.

As methods for counting the number of pairs of layer changes, it is possible to plot all of one round once while counting timings of IN and OUT and then make determination, count only the number of INs or OUTs and make determination with the count as the number of pairs as it is, and determine that there are a plurality of pairs when an inversion occurs in layer presence or absence after one pair is obtained (when either IN or OUT has been detected twice) and that the repair object cannot be set. Incidentally, the starting coordinates of the outermost perimeter rectangle to be plotted and the direction of plotting are arbitrary.

[Determination of Whether Repair Object can be Set When Protruding from Node Region]

Description will next be made of determination of whether the repair object can be set or not when the repair object protrudes from the node region where leak determination is made.

Figure 20:
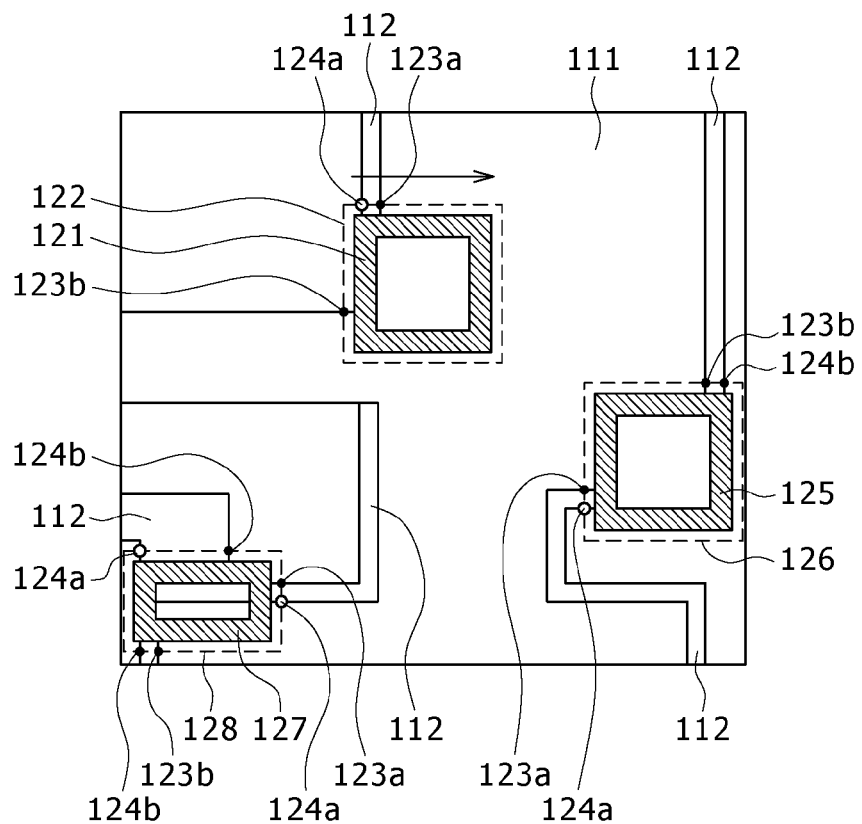
FIG. 20 is a diagram showing an example of repair objects in the enclosure zapping form protruding from a node region where leak determination is made.

FIG. 20 is a diagram showing an example of repair objects in the enclosure zapping form protruding from a node region where leak determination is made. A repair object 121 has a change point 123a indicating timing of the first layer 111 appearing on the plotting line of an outermost perimeter rectangle 122, a change point 123b indicating timing of the first layer 111 disappearing from the plotting line of the outermost perimeter rectangle 122, and a change point 124a indicating timing of the second layer 112 appearing on the plotting line of the outermost perimeter rectangle 122. In addition, a repair object 125 has a change point 123a, a change point 123b, a change point 124a, and a change point 124b indicating timing of the second layer 112 disappearing from the plotting line of the outermost perimeter rectangle 122. Further, a repair object 127 has a change point 123a, a change point 123b, change points 124a and 124a, and change points 124b and 124b.

In the case of the repair objects 121 and 125, one pair is counted for the presence and absence of each of the two layer labels of the first layer 111 and the second layer 112. Therefore the repair objects can be set. However, in the case of the repair object 127, one pair is counted for the first layer 111, whereas two pairs are counted for the second layer 112, indicating the occurrence of a break. Thus, the repair object cannot be set.

Incidentally, in the case of the repair object 127, two parts of the background which parts do not belong to the first layer 111 nor the second layer 112 appear in timing of the second layer 112 disappearing from the plotting line. Regions and labels can be set for the background as shown in FIG. 16 in the same manner as for layers, and when a plurality of label numbers of the background appear, it can be determined that at least the regions of the two parts exist with wiring interposed between the two parts. It is accordingly possible to determine that there is a break in that timing, and determine that the repair object cannot be set.

[Interference with Laser Irradiation Prohibiting Region]

Figure 21:
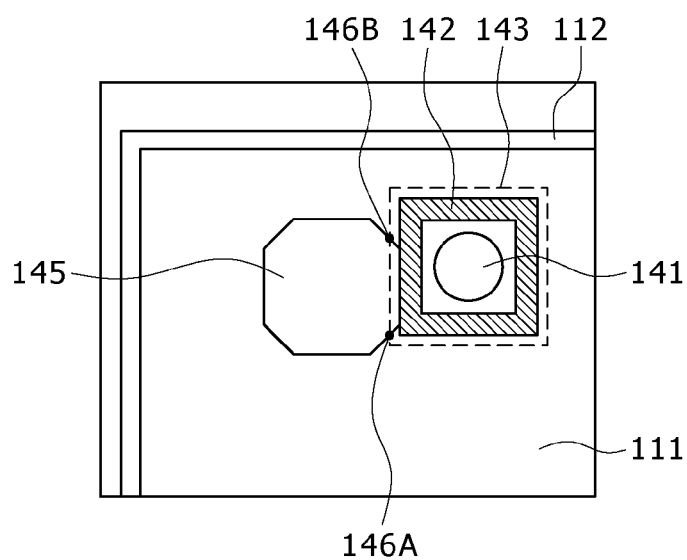
FIG. 21 is a diagram showing an example in which a plotting line of an outermost perimeter rectangle of a repair object in the enclosure zapping form interferes with a laser irradiation prohibiting region.

A first condition used to determine that a repair object cannot be set in addition to a break in wiring is interference of the repair object with a laser irradiation prohibiting region. An image of a laser irradiation prohibiting region being detected in a process of plotting of an outermost perimeter rectangle as in determination of a break when a repair object is arranged is as shown in FIG. 21. FIG. 21 is a diagram showing an example in which a plotting line of an outermost perimeter rectangle of a repair object in the enclosure zapping form interferes with a laser irradiation prohibiting region.

In this example, a leak defect 141 does not overlap a laser irradiation prohibiting region 145. However, a plotting line of an outermost perimeter rectangle 143 of a repair object 142 for the leak defect 141 overlaps the laser irradiation prohibiting region 145. Change points 146A and 146B are coordinates at which the overlapping of the laser irradiation prohibiting region 145 can be confirmed in the process of plotting, and thereby it can be determined that the repair object interferes with the laser irradiation prohibiting region 145.

[Interference with Region Other than Node Region]

Description will next be made of an example of a repair object interfering with a region other than a node region.

Figure 22:
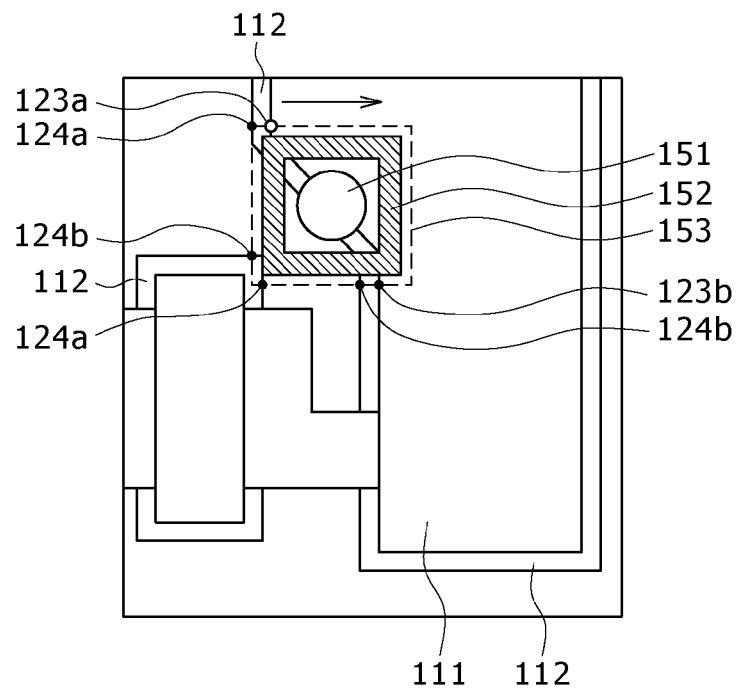
FIG. 22 is a diagram showing an example in which a plotting line of an outermost perimeter rectangle of a repair object in the enclosure zapping form interferes with a region other than a node region.

FIG. 22 is a diagram showing an example in which a plotting line of an outermost perimeter rectangle of a repair object in the enclosure zapping form interferes with a region other than a node region. A repair object 152 for a leak defect 151 has change points 123a and 123b for the first layer 111 and two change points 124a and two change points 124b for the second layer 112 on the plotting line of the outermost perimeter rectangle 153. In this case, the type of a layer (second layer 112) is the same in a process of plotting, but changes in presence or absence of different labels are detected. In such a case, it is determined that there is an interference with a region other than the node region, and that the repair object cannot be set.

In the cases of interferences with a laser irradiation prohibiting region and a region other than a node region, unlike a break, the number and types of layer labels present within a rectangular area represented by an outermost perimeter rectangle OuterMostRect when a repair object is arranged are obtained, and thereby whether the repair object can be set or not can be determined from the contents. That is, whether the repair object can be set or not can be determined without layer change points being detected.

Incidentally, the obtainment of information indicating the composition of layer labels within a specific region is described in Japanese Patent Laid-Open No. 2010-102050, for example. As for a method of determination in this case, it is determined that a repair object cannot be set when a laser irradiation prohibiting region is present within a defect area or the rectangular area of an outermost perimeter rectangle OuterMostRect as a target of plotting, or when a layer label not included within an area forming a node is detected.

[Determination of Area of Decreasing Node Region]

The area of a node region decreasing with the performance of defect correction will be defined as follows.

Figure 23:
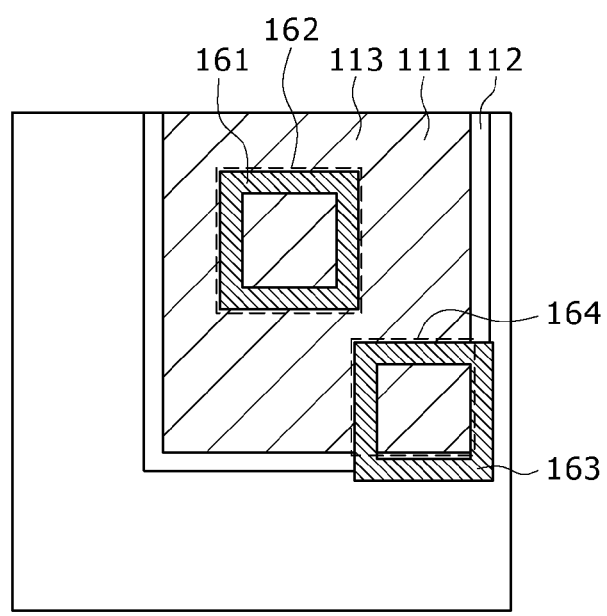
FIG. 23 is a diagram of assistance in explaining the definition of the area of a node region decreasing with the performance of defect correction by repair objects in the enclosure zapping form.

FIG. 23 is a diagram of assistance in explaining the definition of the area of a node region decreasing with the performance of defect correction by repair objects in the enclosure zapping form. When no layer change is detected in determination based on the plotting of the above outermost perimeter rectangle as in the case of a repair object 161, the area of an outermost perimeter rectangle (OuterRect) 162 of the repair object 161 represents an area by which a node region decreases as it is. In addition, as in the case of a repair object 163, when a part of the repair object protrudes from a node region 113, a part 164 in which the node region 113 and the region of the outermost perimeter rectangle of the repair object 163 overlap each other represents an area by which the node region decreases.

When a plurality of repair objects are set in a same node region, a sum total of areas by which the node region is decreased by the repair objects is the area by which the node region is decreased. However, when repair objects partly overlap each other, the part of the overlap is cancelled out.

When a large area is removed from a node region, the circuit of the repetitive pattern is greatly affected, and a degradation in product quality occurs. Thus, an upper limit of an area removed from a node region is specified by an arbitrary parameter (RemoveLimit), and defect correction can be made as long as the upper limit is not exceeded. The parameter RemoveLimit indicating a rate at which a decrease in area is allowed is set for each node region in which a leak defect occurrence region is defined. A definition of an area removable from the area of a node region may be a rate (percentage) or the value of an actual area.

Suppose that a step to be taken when an area actually removed by defect correction exceeds the parameter RemoveLimit can be selected from the following two steps by node or according to the feature of a circuit element or the like.

(1) When a plurality of repair objects are arranged, defect correction is made by only repair objects by which the correction can be made.
→Removed areas are added in order of arrangement of the repair objects, and defect correction is not made by subsequent repair objects when the parameter RemoveLimit is exceeded.
→A combination of repair objects that maximize removed areas where defect correction can be made within a range not exceeding the parameter RemoveLimit is obtained, and defect correction is made.
(2) No defect correction is made irrespective of the number of repair objects arranged.

In determination of a break by a repair object in the enclosure zapping form as shown thus far, when only one background region is detected or when no background region is detected, there occurs a case where no break is caused in a strict sense even if a plurality of layer changes are made. Details of the case will be described in the following.

Figure 24:
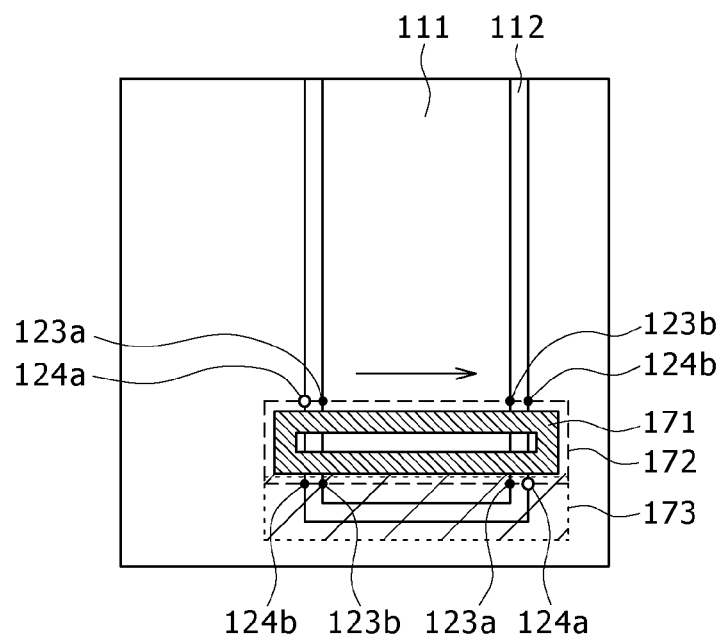
FIG. 24 is a diagram showing an example of determining that a defect that it is not appropriate to determine as a break is a break.

FIG. 24 is a diagram showing an example of determining that a defect that it is not appropriate to determine as a break is a break.

In this example, there are eight change points on the plotting line of an outermost perimeter rectangle 172 of a repair object 171. When defect correction is made, a region 173 is parted. This expression is correct in a sense that the first layer 111 as a target of determination is parted. However, no break occurs in the wiring, so that other circuits are not affected. It is thus possible to determine that there is a parting and that a defect correction setting can be made. However, a large region disappears from a capacitor section (or a leak occurrence region), and is thus expected to degrade the characteristic of a circuit element greatly. That is, a removed area may be expected to exceed the specified upper limit, and there is consequently a strong possibility that defect correction cannot be made even when there is no break.

In addition, because of the large area of the defect itself, there is a strong possibility that the defect is caused by another factor such as the adhesion of foreign matter or the like, and whether it is possible to determine that an interlayer leak is caused itself is doubtful. There is thus a strong possibility that the method of defect correction in the enclosure zapping form is not appropriate. Thus, even in the case of a layer being parted as in FIG. 24, the method at the time of a break can be used for the determination itself of whether defect correction can be made or not.

[Example of Determining Break that is Not Break in Enclosure Zapping Form]

Description will next be made of an example of determining a break that is not a break in the enclosure zapping form.

Figure 25:
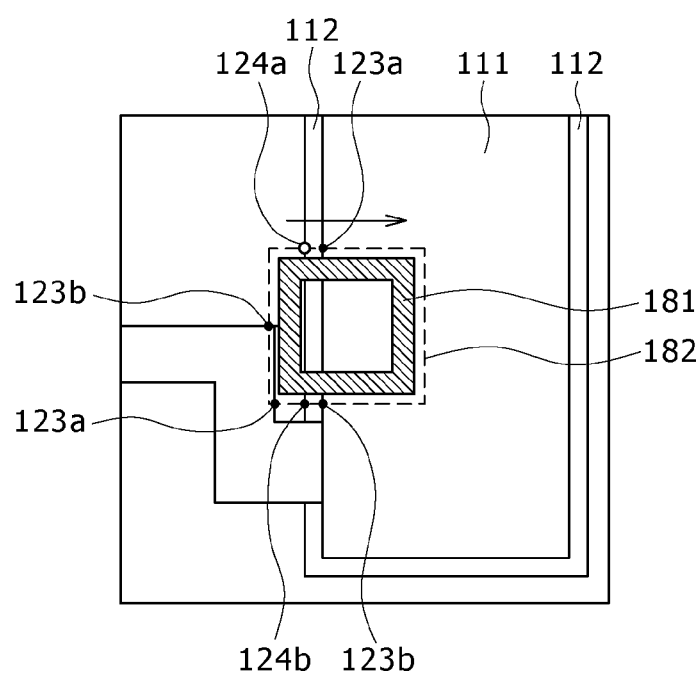
FIG. 25 is a diagram showing an example of determining a break that is not a break in the enclosure zapping form.

FIG. 25 is a diagram showing an example of determining a break that is not a break in the enclosure zapping form. In this example, while there are six change points on the plotting line of an outermost perimeter rectangle 182 of a repair object 181, there is no parting of a region, and there is no change to a different layer label. Thus, there occurs no interference with other circuits, and the circuit of the repetitive pattern is not affected. However, it cannot necessarily be guaranteed that there is no parting in the case of a single background region as in FIG. 24. Thus, it may be practically impossible to determine that a defect correction setting can be made on the basis of only the number of layer label changes. In order to solve this, a method of optimizing a part of the shape of a repair object in the enclosure zapping form will be proposed in the following.

[Optimization of Repair Objects in Enclosure Zapping Form]

Figure 26:
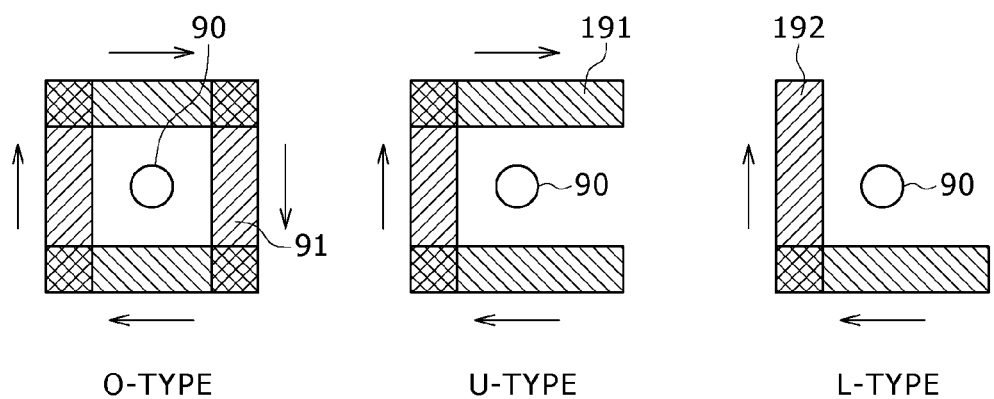
FIG. 26 is a diagram showing an example of objects obtained by optimizing a part of a repair object in the enclosure zapping form.

FIG. 26 shows an example of objects obtained by optimizing a part of a repair object in the enclosure zapping form.

When a repair object in the enclosure zapping form which surrounds the defect region of a leak defect 90 on four sides is set as an O-type (ZAP_O), two types are considered as modified types of the O-type. Of the two types, the one in which a scan is not performed on one side will be defined as a U-type (ZAP U) (repair object 191), and the one in which a scan is not performed on two sides will be defined as an L-type (ZAP L) (repair object 192).

The definition of a repair object in the enclosure zapping form which repair object is optimized to the U-type or the L-type is as follows.
 No layer change in specific order of IN to OUT occurs on the line of one side of an outermost perimeter rectangle OuterMostRect.
 There are a plurality of vertexes (OuterRect vertexes) not including a node region of a leak defect.
 There is at least one vertex (OuterRect vertex) including a node region of a leak defect.

When the above conditions are satisfied, scan processing of a part connecting vertexes not including the node region to each other is not performed, and a repair object having a starting point and an ending point different from each other is defined. In addition, in the case of the L-type, the parameter of turning coordinates of a vertex whose scan is omitted (coordinates of ZapTurn[2]=Third Turning Point (Upper Right Vertex in FIG. 26)) among the turning coordinates of the scan path of a laser becomes invalid.

Description will next be made of repair objects optimized by increasing vertexes to be scanned.

Figure 27:
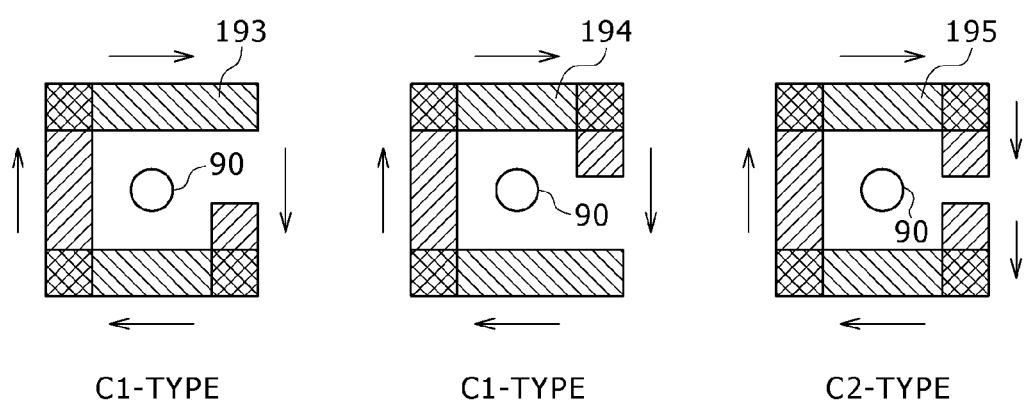
FIG. 27 is a diagram showing an example of objects formed by further optimizing a part of a repair object in the enclosure zapping form.

FIG. 27 shows an example of objects formed by further optimizing a part of a repair object in the enclosure zapping form. In addition to the U-type and the L-type in which the scanning of vertex parts is omitted, two kinds of modified types in which vertexes to be scanned are increased are defined as a C-type. The C-type includes a C1 type (repair objects 193 and 194) and a C2 type (repair object 195). The C1 type and the C2 type change according to whether one of a starting point and an ending point is a vertex of the O-type.

The definition of a repair object in the enclosure zapping form which repair object is optimized to the C1 type or the C2 type is as follows.

No layer change in specific order of IN to OUT occurs on the line of one side of an outermost perimeter rectangle OuterMostRect.

There is a vertex (OuterRect vertex) not including a node region of a leak defect, or there is no such vertex.

There are three or more vertexes (OuterRect vertexes) including a node region of a leak defect.

When the above conditions are satisfied, scan processing of a region part not including the node region is not performed, turning coordinates of a scan path of a laser are added according to the shape of the repair object, and the repair object having a starting point and an ending point different from each other is defined. In FIG. 27, ZapTurn[3] is added to the C1 type, and ZapTurn[3] and ZapTurn[4] are added to the C2 type.

Optimization more conforming to the shape of the circuit of the repetitive pattern can be expected from the C1 type and the C2 type. On the other hand, the C1 type and the C2 type increase the number of vertexes and complicate processes. Thus, the C1 type and the C2 type are expected to take longer process time than the O-type, the U-type, and the L-type, depending on the performance of a laser, a control method, and processing time. Thus, a type of repair object used to perform optimization depends on a laser correcting device and a circuit.

When it is determined that all the types of repair objects shown in FIG. 26 and FIG. 27 can be used, the selection of a type of repair object used for optimization is determined according to the following conditions (however, this does not apply when the repair object is divided into a plurality of parts).

the L-type when there are three vertexes (OuterRect vertexes) not including a node region of a leak defect.

the U-type when there are two vertexes (OuterRect vertexes) not including a node region of a leak defect.

the C1 type when there is one vertex (OuterRect vertex) not including a node region of a leak defect.

the C2 type when there is no vertex (OuterRect vertex) not including a node region of a leak defect.

A concrete method of optimizing a repair object in the enclosure zapping form is as follows.

Figure 28:
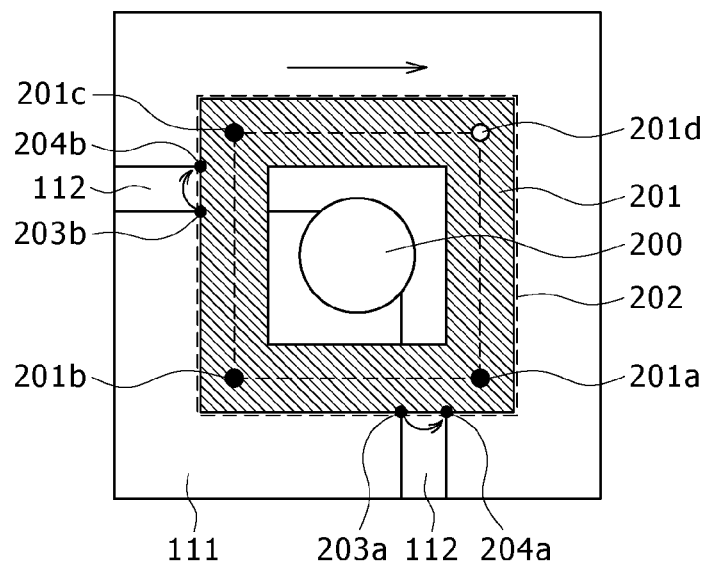
FIG. 28 is a diagram (1) of assistance in explaining a method of optimizing a repair object in the enclosure zapping form.
Figure 29:
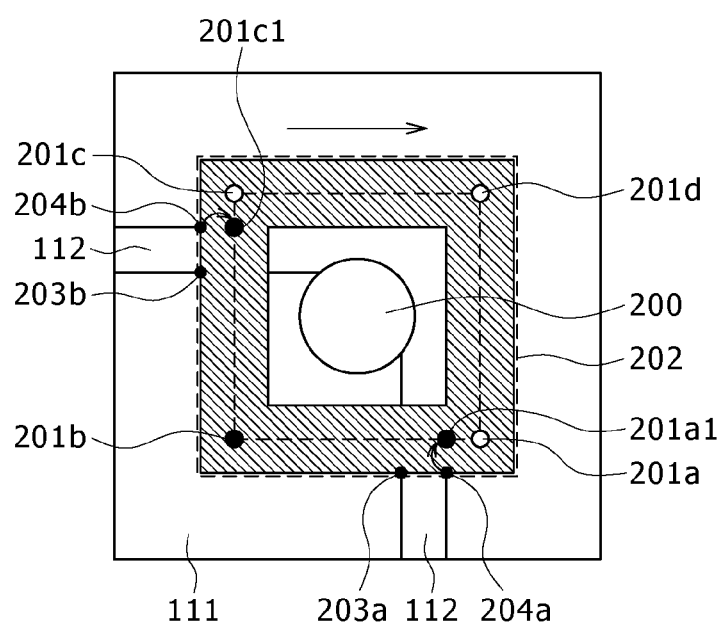
FIG. 29 is a diagram (2) of assistance in explaining the method of optimizing the repair object in the enclosure zapping form.
Figure 30:
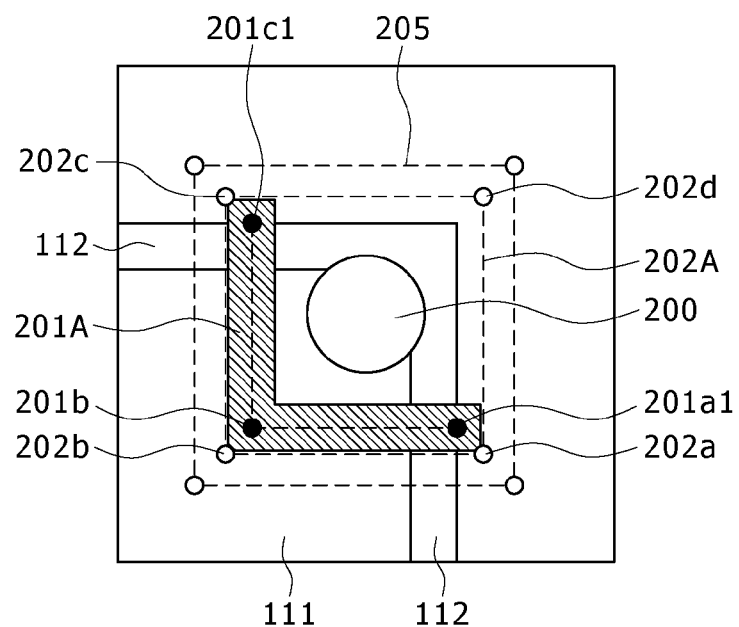
FIG. 30 is a diagram (3) of assistance in explaining the method of optimizing the repair object in the enclosure zapping form.

FIGS. 28 to 30 are diagrams of assistance in explaining a method of optimizing a repair object in the enclosure zapping form. For a repair object 201 enclosing a leak defect 200, the turning coordinates of four vertexes 201a to 201d that a laser irradiation region is made to pass through are obtained. Of the vertexes, the vertex 201d is a vertex not scanned later. Then, an outer perimeter rectangle (OuterRect) 202 of the repair object is plotted as in break determination, and the coordinates of change points 203a and 203b at which the presence or absence of a node region (corresponding to the first layer 111) changes are obtained on the plotting line. Coordinates obtained by offsetting (moving) the coordinates on the plotting line by an arbitrary size (ZapTurnOffsetSize) in a direction in which the node region is not present are defined as new vertexes 204a and 204b, respectively (see FIG. 28).

Then, after scanning is performed by making one round on the plotting line, the turning coordinates of the newly defined vertexes 204a and 204b not included in the node region are changed to coordinates obtained by offsetting the turning coordinates of the newly defined vertexes 204a and 204b in a direction of an inner perimeter of the repair object 201 by a distance of half a slit size (SlitSizeX and SlitSizeY). For example, when the vertex 204a is offset by the distance of half a slit size (SlitSizeY), the vertex 204b is offset by the distance of half a slit size (SlitSizeX). The vertexes after being moved are set as vertexes 201a1 and 201c1, respectively. Next, the new vertexes 201a1 and 201c1 that a laser irradiation region passes, the vertexes 201a1 and 201c1 being represented by the coordinates after the change, are obtained. In contrast to the new vertexes 201a1 and 201c1, the vertexes 201c, 201d, and 201a present on the repair object 201 in the direction in which the node region is not present become invalid, and the vertexes 201a1, 201b, and 201c1 form a new laser scan path (see FIG. 29).

The starting position StartPos of the laser scan path and the vertex ZapTurn[n] (n is an arbitrary turning coordinate) of the scan path are newly rearranged for the new vertexes 201a1, 201b, and 201c1. Then, the coordinates of vertexes 202a to 202d of the outer perimeter of a repair object 201A after the rearrangement are obtained from the coordinates of the starting position and the coordinates of the vertex of the scan path. Of these coordinates, maximum values and minimum values of respective coordinates in the X-direction and the Y-direction are set as maximum coordinates and minimum coordinates of an outer perimeter rectangle (OuterRect) 202A of the repair object 201A after the rearrangement. From the maximum coordinates and the minimum coordinates, a new outermost perimeter rectangle (OuterMostRect) 205 is redefined (see FIG. 30).

The repair object after the rearrangement is not necessarily optimized when the coordinates of a lower right vertex as defined in the O-type (see FIG. 17) are set as starting coordinates. At this time, the coordinates of one of the vertexes newly defined by the rearrangement among the vertexes of the outer perimeter rectangle (OuterRect) of the repair object are set as starting coordinates, and turning coordinates are defined again in accordance with the starting coordinates. Alternatively, the redefinition is given by a method of rotating the repair object whose starting coordinates are defined at a lower right or reversing a scan direction, for example (however, the definition cannot be given by rotation for repair objects of the C1 type and the C2 type whose starting coordinates do not represent a vertex).

Figure 31A:
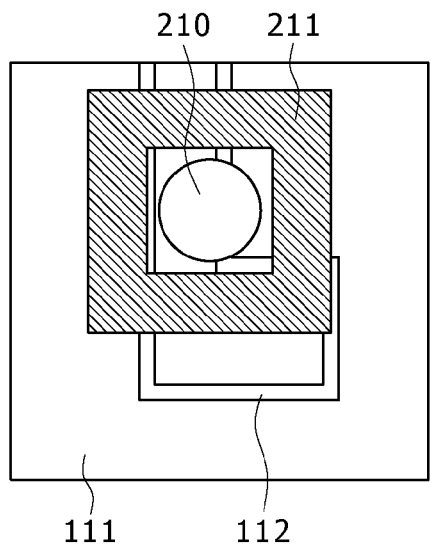
FIGS. 31A and 31B are diagrams showing an example of using an object having an outer perimeter including a part where a leak defect and a node region overlap each other.
Figure 31B:
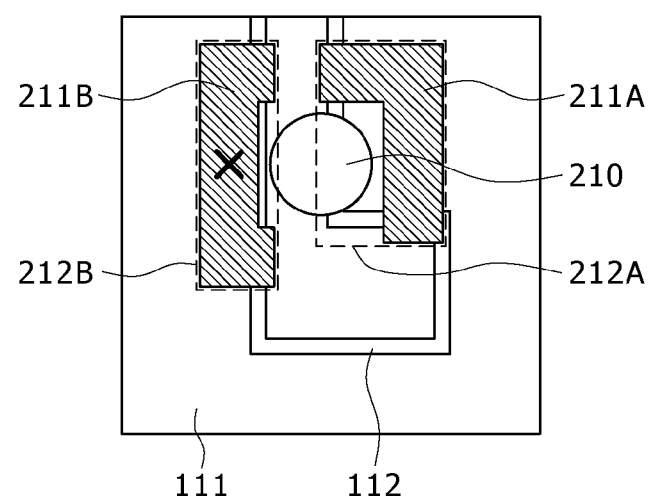

FIGS. 31A and 31B are diagrams showing an example of using an object having an outer perimeter including a part where a leak defect and a node region overlap each other.

A plurality of repair objects may be able to be generated from one repair object in the enclosure zapping form as a result of optimization of the repair object. In the example of FIGS. 31A and 31B, a repair object 211A of the L-type and a repair object 211B of the U-type are generated from a repair object 211 in the enclosure zapping form. The number of repair objects generated is half the number of coordinates set as new vertexes on the plotting line of an outermost perimeter rectangle. That is, in a case of two vertexes, one object is generated, whereas in a case of four vertexes, two objects are generated. In FIG. 31B, two new vertexes are set in each of the repair object 211A and the repair object 211B.

When a plurality of repair objects can be generated, all the repair objects are temporarily rearranged, and a repair object not having a region in which a defect region and a node region overlap each other within the outer perimeter rectangle OuterRect of the repair object is deleted. In the example of FIG. 31B, a region in which a leak defect 210 and the first layer 111 corresponding to a node region overlap each other is present within the rectangle 212A of the repair object 211A, whereas no such region is present within the rectangle 212B of the repair object 211B. Thus, the repair object 211B is deleted.

Incidentally, cases in which erroneous determination is made in relation to repair objects in the enclosure zapping form as shown in FIG. 24 and FIG. 25 depend on the shape of the circuit. There may be cases where a region capable of defect correction is determined to be a region incapable of defect correction, but there are no reverse cases. Thus, determining that defect correction is to be stopped without optimizing the repair object in consideration of a fear of making correction to a region incapable of defect correction is effective as an option.

[Defect Correction by Stationary Zapping]

Description will next be made of a method of generating a repair object in the stationary zapping form according to the size of the region of an actual defect.

Figure 32:
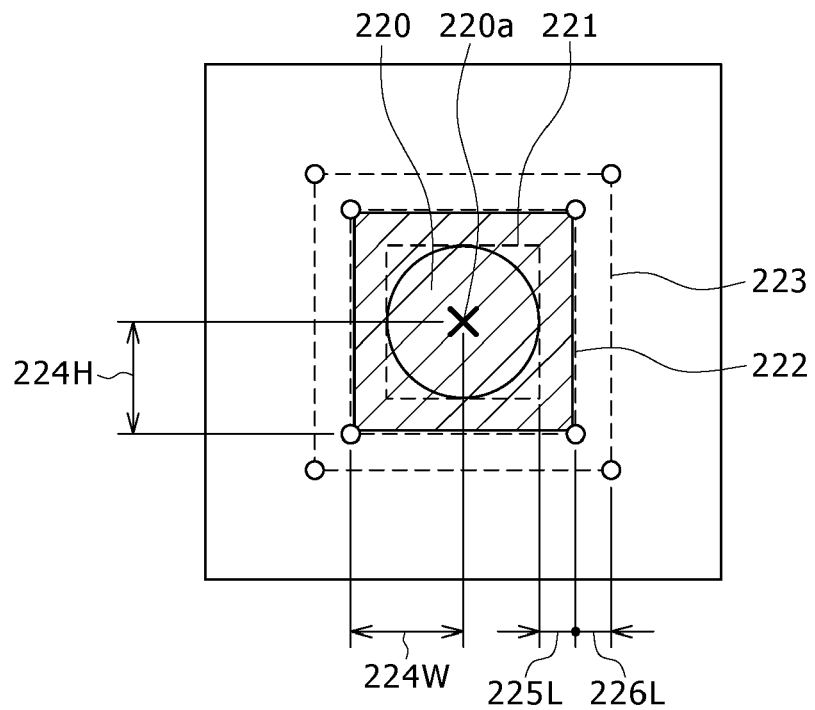
FIG. 32 is a diagram of assistance in explaining a repair object in a stationary zapping form and parameters for generating the repair object.

FIG. 32 is a diagram of assistance in explaining an image of the setting of a repair object in the stationary zapping form shown in FIG. 15B and parameters for determining whether the repair object can be arranged. Each of the parameters is defined as follows. When the shape of a defect is angled as in a case of an oblique ellipse, an area removal range relative to the area of the defect is increased. However, this is considered to have substantially no effect because most leak defects are minute defects, and all repair objects are set at an angle of rotation of zero degrees.

The vertexes of a quadrangle 221 (DefectRect) circumscribed around a leak defect 220 will be defined as "Top, Left, Right, and Bottom." The width and height of the quadrangle 221 (DefectRect) will be defined as "Width and Height." Half the width 224W and half the height 224H of laser processing size (hereinafter referred to as slit sizes) will be defined as "SlitSizeX and SlitSizeY." Further, a distance 225L from the quadrangle 221 (DefectRect) circumscribed around the leak defect 220 to the outer perimeter rectangle ZapRect (rectangular region irradiated with a laser) of a repair object 222 will be defined as "InnerDist." A shortest distance 226L from the outer perimeter OuterRect of the repair object 222 to a laser irradiation prohibiting region over which distance correction can be made will be defined as "OuterDist." At this time, central coordinates 220a (StartPosX, StartPosY) as a parameter of the repair object 222 and initial values of the laser slit sizes (SlitSizeX and SlitSizeY) are obtained as follows.

$$StartPosX = Left + Width/2$$

$$StartPosY = Top + Height/2$$

$$SlitSizeX = Width/2 + InnerDist$$

$$SlitSizeY = Height/2 + InnerDist$$

An upper left is set as the reference of the coordinate system (see FIG. 9).

At this time, the outer perimeter rectangle ZapRect of the repair object 222 is expressed by $$ZapRectLeft = StartPosX - SlitSizeX$$

$$ZapRectTop = StartPosY - SlitSizeY$$

$$ZapRectRight = StartPosX + SlitSizeX$$

$$ZapRectBottom = StartPosY + SlitSizeY$$

Unlike repair objects in the enclosure zapping form, there are no concepts of the inner perimeter (InnerRect) and the outer perimeter (OuterRect), so that ZapRect=InnerRect=OuterRect. Initial values of an outermost perimeter rectangle OuterMostRect including the shortest distance 226L from the laser irradiation prohibiting region to a laser irradiation region are as follows.

$$OuterMostRectLeft = ZapRectLeft - OuterDist$$

$$OuterMostRectTop = ZapRectTop - OuterDist$$

$$OuterMostRectRight = ZapRectRight + OuterDist$$

$$OuterMostRectBottom = ZapRectBottom + OuterDist$$

Whether a repair object can be set is determined and object size is optimized according to conditions of the composition of layer labels and nodes within the regions of the outer perimeter rectangle ZapRect and the outermost perimeter rectangle OuterMostRect of the repair object 222.

Conditions for determining whether a repair object in the stationary zapping form can be set are basically the same as in the enclosure zapping form. However, because a repair object in the stationary zapping form is basically a repair object for irradiating a defect with a laser directly, a condition that a defect exceeding a certain area should not be dealt with is added.

[Interference with Laser Irradiation Prohibiting Region]

Next, a check for an upper limit of defect area and a check for interference with a laser irradiation prohibiting region are made. When the area of a leak defect is larger than an area specified in advance, it is determined that the defect area is large and that a defect correction setting cannot be made. In this case, the leak defect is dealt with in the enclosure zapping form, or defect correction is not made.

As in the case of the enclosure zapping form (O-type) (see FIG. 21), when a laser irradiation prohibiting region overlaps within the area of the outermost perimeter rectangle OuterMostRect of a repair object in the stationary zapping form, it is determined that defect correction cannot be made to a target defect.

Figure 33:
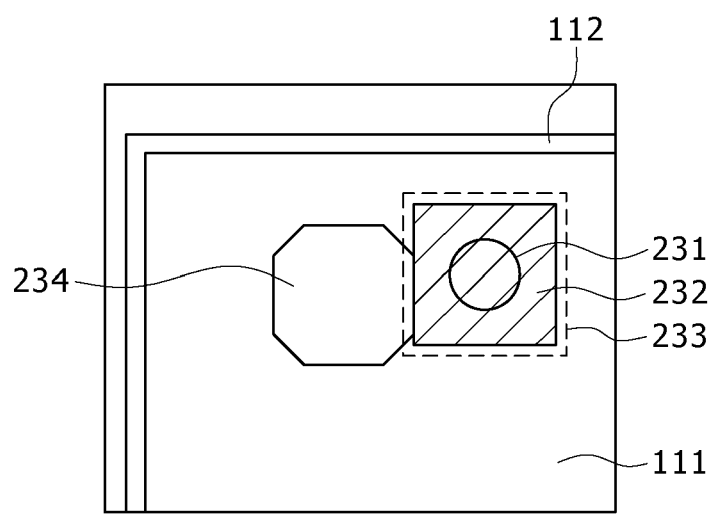
FIG. 33 is a diagram showing an example in which a plotting line of an outermost perimeter rectangle of a repair object in the stationary zapping form interferes with a laser irradiation prohibiting region.

In the example of FIG. 33, a leak defect 231 does not overlap a laser irradiation prohibiting region 234. However, a plotting line of an outermost perimeter rectangle 233 of a repair object 232 in the stationary zapping form overlaps the laser irradiation prohibiting region 234. When interference with the laser irradiation prohibiting region is thus detected, it is determined that the repair object in the stationary zapping form cannot be set.

[Determination of Parting of Wiring]

Description in the following will be made of parting of wiring due to an effect of a repair object in the stationary zapping form.

Figure 34:
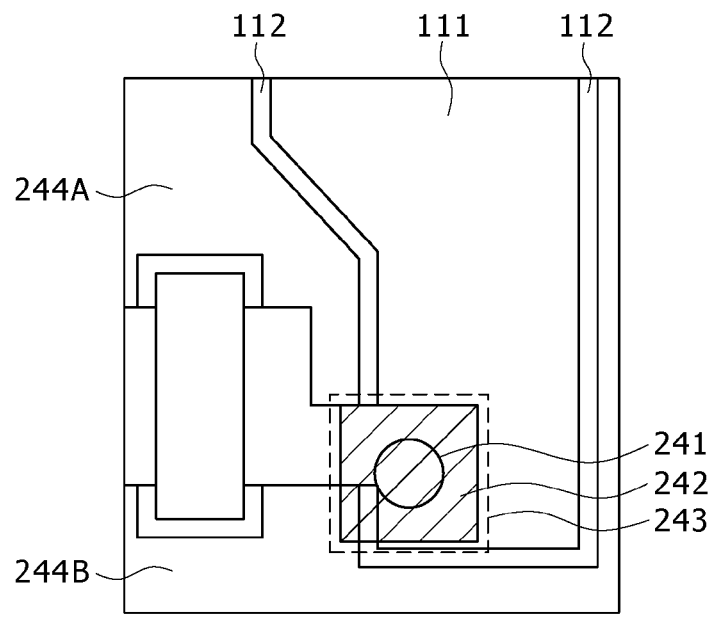
FIG. 34 is a diagram showing an example of a repair object in the stationary zapping form protruding from a node region where leak determination is made.

FIG. 34 is a diagram showing an example of a repair object in the stationary zapping form protruding from a node region where leak determination is made. Whether wiring is parted is determined by checking the detection of a background label (see FIG. 16) and thereafter plotting the outermost perimeter rectangle OuterMostRect as a range of determination as in the enclosure zapping form. First, a check is made for the presence of a background label from layer element changes when the outermost perimeter rectangle OuterMostRect is plotted. In the example of FIG. 34, two different background regions (labels) 244A and 244B are detected by plotting an outermost perimeter rectangle 243 of a repair object 242 in the stationary zapping form for a leak defect 241. Thus, a break is determined when a plurality of different background regions (labels) are detected, and therefore it is determined that defect correction cannot be made.

[Interference with Region Other than Node Region]

After the background label is confirmed, a check is made for interference with a region (circuit) other than a node region as in the case of the enclosure zapping form (see FIG. 21).

Figure 35:
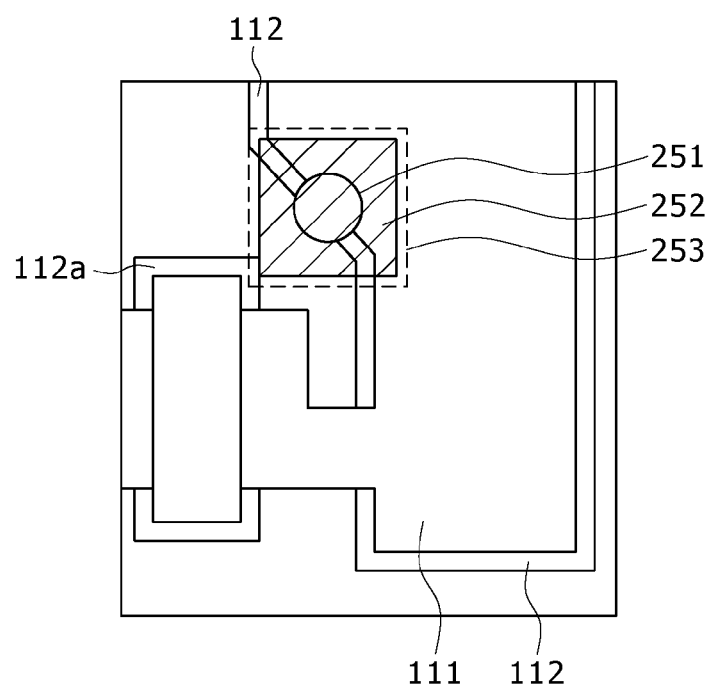
FIG. 35 is a diagram showing an example in which a plotting line of an outermost perimeter rectangle of a repair object in the stationary zapping form interferes with a region other than a node region.

FIG. 35 is a diagram showing an example in which a plotting line of an outermost perimeter rectangle of a repair object in the stationary zapping form interferes with a region other than a node region. The outermost perimeter rectangle 253 of the repair object 252 in the stationary zapping form for a leak defect 251 overlaps two second layer regions 112 and 112a. The two second layer regions 112 and 112a are of a same kind but are different labels. In such a case, it is determined that there is an interference with a region other than a node region, and that the repair object cannot be set.

Finally, determination for a break is made by plotting the outermost perimeter rectangle of the repair object. Suppose that basically the same determination as in the case of the enclosure zapping form is made.

Figure 36:
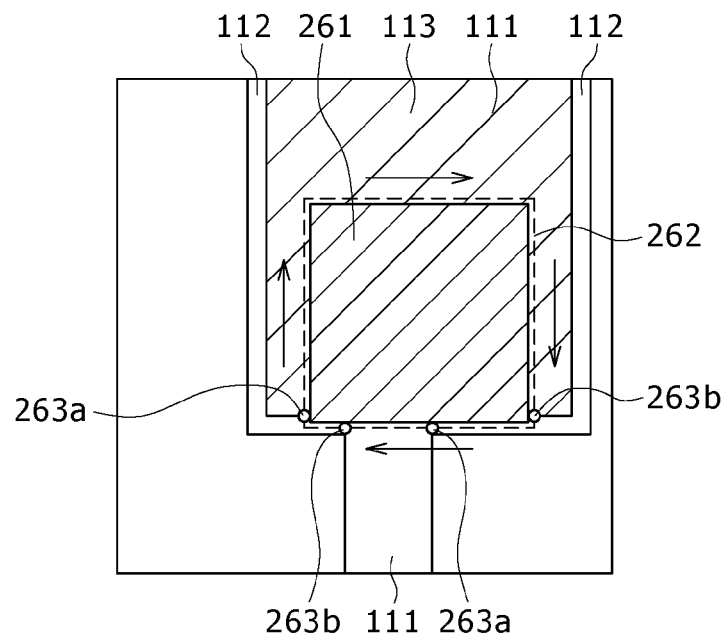
FIG. 36 is a diagram showing an example of determining the parting of wiring on the basis of a plotting line of an outermost perimeter rectangle of a repair object in the stationary zapping form.

FIG. 36 is a diagram showing an example of determining the parting of wiring on the basis of a plotting line of an outermost perimeter rectangle in the stationary zapping form. Layer labels present on an outermost perimeter rectangle 262 in a process of plotting the outermost perimeter rectangle 262 of a repair object 261 in the stationary zapping form are two kinds of layer labels of the first layer 111 and the second layer 112. A change point 263a indicates timing of the first layer appearing on the plotting line. A change point 263b indicates timing of the first layer disappearing from the plotting line. In the example of FIG. 36, as in the case of the enclosure zapping form (see FIG. 19), it can be determined that the first layer 111 is broken.

Thus, when a plurality of labels are detected in a same layer, or when a layer label not present in a node region as a target of determination is detected, it is determined that there is an interference with another region (circuit), and when a plurality of IN and OUT changes plotted on a same layer label are detected, it is determined that there is a possibility of a break, and that defect correction cannot be made.

There is a case where erroneous determination is made on a defect among defects determined to be incapable of defect correction in determination of interference with a region other than a node region and determination of a break, depending on the position of occurrence of the defect and the shape of layers, as in the case of the enclosure zapping form. However, in the case of the stationary zapping form, a defect region is directly irradiated with a laser, and thus a laser irradiation area is smaller than in the case of the enclosure zapping form. Therefore, the frequency of erroneous determination is expected to be low unless wiring within the repetitive pattern is in very close proximity or unless a large value is set to InnerDist or OuterDist. Even if defect correction is actually determined erroneously to be impossible, it is desirable not to perform laser irradiation in consideration of a fear of making correction to a region incapable of defect correction. Thus, this time, suppose that optimization in the stationary zapping form is not necessary.

[Determination of Area of Decreasing Node Region]

The area of a node region decreasing with the performance of defect correction will be defined as follows.

Figure 37:
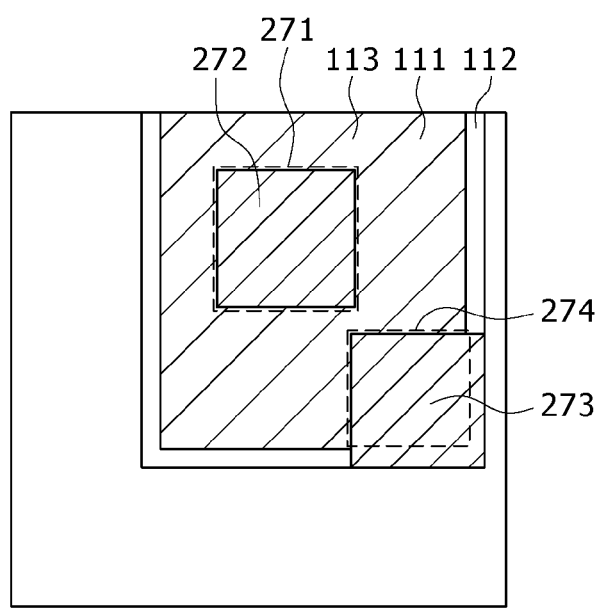
FIG. 37 is a diagram of assistance in explaining the definition of the area of a node region decreasing with the performance of defect correction by repair objects in the stationary zapping form.

FIG. 37 is a diagram of assistance in explaining the definition of the area of a node region decreasing with the performance of defect correction by repair objects in the stationary zapping form. A method of obtaining the area of the decreasing node region may be defined in the same manner as in the enclosure zapping form, and a method of cancellation when a plurality of repair objects overlap each other may be the same as in the enclosure zapping form (see FIG. 23). In the example of FIG. 37, parts 272 and 274 in which the respective outer perimeter rectangles of repair objects 271 and 273 overlap a node region 113 in which a leak defect occurs represent an area by which the node region is decreased.

The corresponding forms, the order of priority and the like of repair objects in the enclosure zapping form or the stationary zapping form in the above-described embodiment depend on the defect correcting apparatus, circuit conditions, and laser settings. Typically, it is preferable to prioritize the stationary zapping form involving short processing time, and to generate a repair object in the enclosure zapping form when defect correction cannot be made in the stationary zapping form.

[Provision for Case where Defect Region Does Not Overlap Node Region]

A leak defect is not necessarily a short-circuit defect between an upper layer and a lower layer of a multilayer structure.

Figure 38:
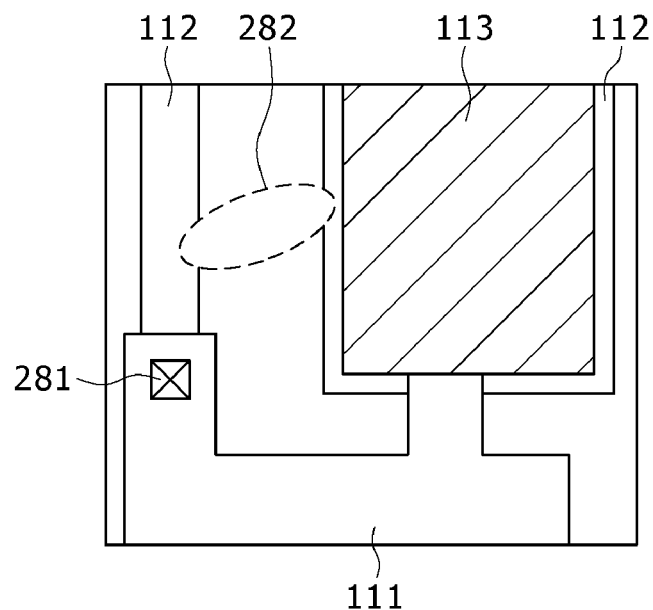
FIG. 38 is a diagram showing an example in which a leak defect is determined by electric conduction inspection.

FIG. 38 is a diagram showing an example in which a leak defect is determined by electric conduction inspection. In this example, a defect 282 caused by a deformation of the second layer 112 short-circuits a different layer label of the second layer 112. In this case, there is no defect within the node region 113 where a leak defect occurs, and the defect can be considered to be a same-layer short circuit to be exact. However, a contact hole 281 connects the first layer 111 and the second layer 112 to each other, and therefore the first layer 111 and the second layer 112 are short-circuited. Thus, the defect produces the same result as an interlayer short circuit as a kind of defect, and the defect cannot be distinguished from an interlayer short circuit until an image of the repetitive pattern is obtained.

Figure 39:
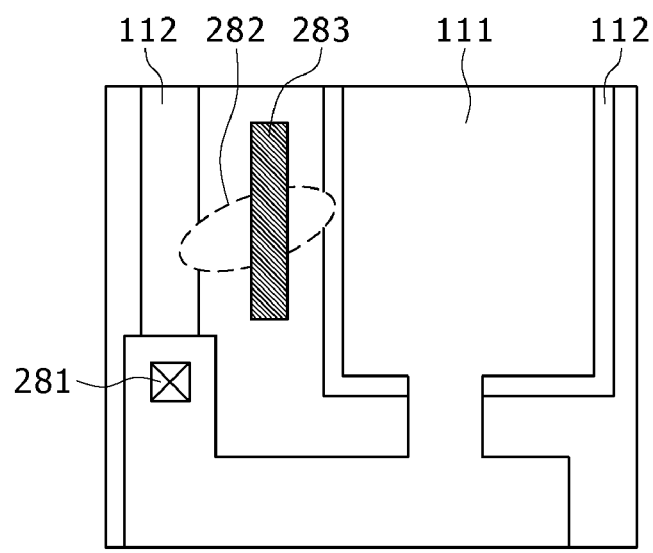
FIG. 39 is a diagram showing an example of applying a template in the past to the leak defect in FIG. 38.

In such a case, as in the case of a same-layer short-circuit defect, it is effective to obtain and apply a repair object 283 by the registration of a template in the past as shown in FIG. 39. In addition, in this case, the removal area of a circuit region as a result of defect correction is not considered. Thus, switching between the method of defect correction by the automatic generation of a repair object using enclosure zapping or stationary zapping according to an embodiment of the disclosure of the present application and the method of defect correction using a template in the past is preferably performed according to the position of occurrence of the defect.

In the method of defect correction for a leak defect, a plurality of repair objects can be generated for a defect occurring in a region of occurrence of the leak defect (node region) using enclosure zapping or stationary zapping according to the performance of a laser, adjustment conditions, and the like. However, as for the selection and application of a registered template in the past, because a template using a CVD object for performing a wiring connecting process causes a problem when overlapping a repair object for another region, conditions for making the template applicable are limited when there are a plurality of defect regions.

Basically, the template is applicable when the CVD object does not overlap another defect region or a repair object targeted at another defect region. In addition, when a defect region incapable of defect correction and a defect region capable of defect correction are mixed with each other as a plurality of defect regions, a message to that effect is output together with the template.

[Process of Obtaining Defect Correcting Method (Repair Object) for Leak Defect]

Figure 40:
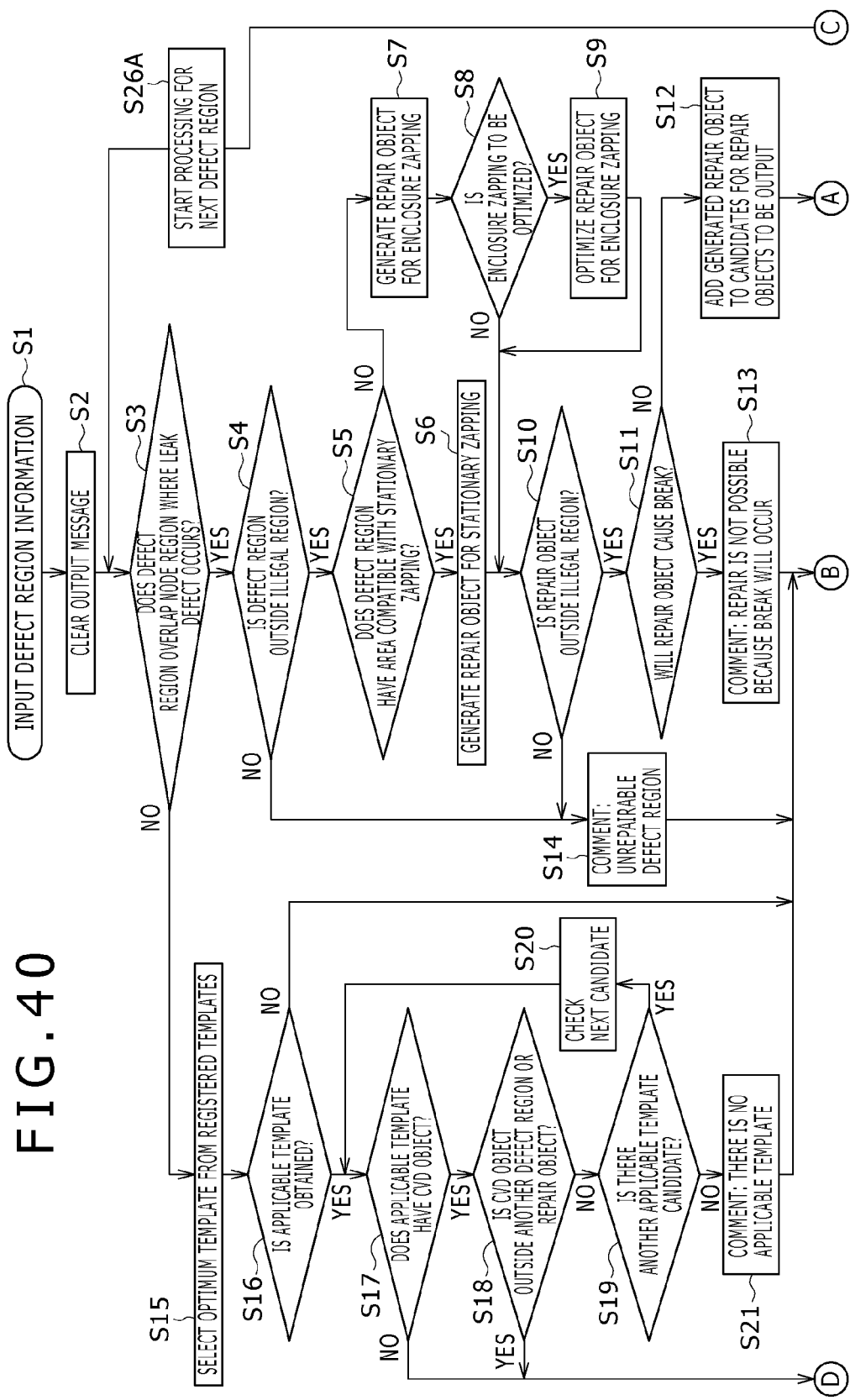
FIG. 40 is a flowchart (1) of an example of a procedure for obtaining a defect correcting method (repair object) for a leak defect according to one embodiment of the present disclosure.
Figure 41:
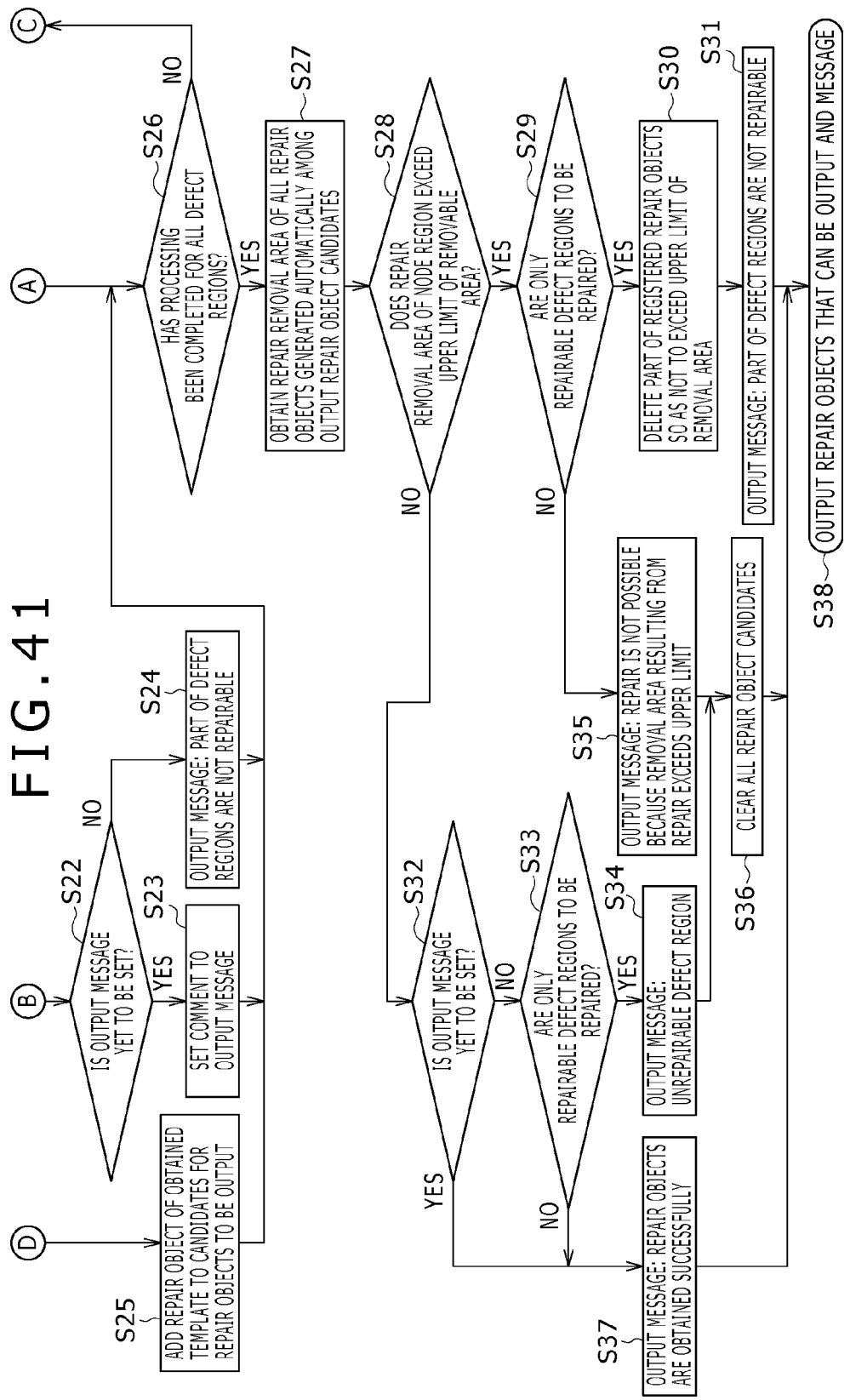
FIG. 41 is a flowchart (2) of the example of the procedure for obtaining a defect correcting method (repair object) for a leak defect according to one embodiment of the present disclosure.

An example of a procedure for obtaining a defect correcting method for a leak defect which procedure is performed by the control device 301 (the procedure corresponds to the optimization of the defect correcting method (repair object) in step S18 in FIG. 7) will be described in the following with reference to FIG. 40 and FIG. 41. Incidentally, the procedure shown in FIG. 40 and FIG. 41 is a mere example because the procedure shown in FIG. 40 and FIG. 41 represents each of the above-described processes in one flow. The order of a part of the processes can be changed, and a part of the processes can be omitted. Thus, the procedure is not limited to this example.

First, defect region information indicating the position, feature, and the like of a leak defect is input from the defect detecting device 303 to the control device 301 (see FIG. 5) (step S1). The defect region information input to the control device 301 is input to the image processing section 352 via the input-output section 351 (see FIG. 6), and the image processing section 352 performs image processing as appropriate. When the control device 301 detects from the defect region information that the leak defect is present in the repetitive pattern, the control device 301 clears an output message (step S2).

Next, the defect determining section 353 (see FIG. 6) of the control device 301 determines from the defect region information whether a defect region overlaps a node region in which the leak defect occurs (step S3) (see FIG. 38). When the defect region overlaps the node region, the process proceeds to step S4. When the defect region does not overlap the node region, the process proceeds to step S15.

When the defect region overlaps the node region in which the leak defect occurs in the determination process of step S3, the defect determining section 353 determines whether the defect region does not overlap an illegal region (step S4). When the defect region does not overlap an illegal region, the process proceeds to step S5. When the defect region overlaps an illegal region, the process proceeds to step S14. The illegal region in this case corresponds to a laser irradiation prohibiting region (see FIG. 21 and FIG. 33), a layer label other than layer labels forming the node region (see FIG. 22 and FIG. 35), a plurality of background labels (see FIG. 20 and FIG. 34), and a region other than the node region when a plurality of labels are detected in a same layer (FIG. 22 and FIG. 35).

When the defect region does not overlap an illegal region in the determination process of step S4, the defect determining section 353 determines whether the defect region has an area that can be dealt with by stationary zapping (step S5). As described in the description of FIG. 32, the defect region having an area that can be dealt with by stationary zapping means that the area of the defect region is smaller than an area as a set upper limit. When the defect region has an area that can be dealt with by stationary zapping, the process proceeds to step S6. When the defect region has an area that cannot be dealt with by stationary zapping, the process proceeds to step S7.

When the defect region has an area that can be dealt with by stationary zapping in the determination process of step S5, the repair object generating section 354 generates a repair object in the stationary zapping form (step S6) (see FIG. 32). After this process is ended, the process proceeds to step S10.

When the defect region does not have an area that can be dealt with by stationary zapping in the determination process of step S5, the repair object generating section 354 generates a repair object in the enclosure zapping form (step S7) (see FIG. 17).

Next, the enclosure zapping optimizing section 355 determines whether the generated repair object in the enclosure zapping form is to be optimized (step S8). When the repair object in the enclosure zapping form is to be optimized, the process proceeds to step S9. When the repair object in the enclosure zapping form is not to be optimized, the process proceeds to step S10.

When it is determined in the determination process of step S8 that the repair object in the enclosure zapping form is to be optimized, the enclosure zapping optimizing section 355 optimizes the repair object in the enclosure zapping form as a target (step S9) (see FIG. 26 and FIGS. 27 to 30). After this process is ended, the process proceeds to step S10.

After the determination process of step S8 or the process of step S6 or S9 is ended, the repair object determining section 356 determines whether the generated repair object does not overlap an illegal region (step S10). When the generated repair object overlaps an illegal region, the process proceeds to step S14. When the generated repair object does not overlap an illegal region, the process proceeds to step S11.

When the generated repair object does not overlap an illegal region in the determination process of step S10, the repair object determining section 356 determines whether a break is caused by the generated repair object (step S11). When no break is caused by the generated repair object, the process proceeds to step S12. When a break is caused by the generated repair object, the process proceeds to step S13.

When no break is caused by the generated repair object in the determination process of step S11, the repair object determining section 356 adds the repair object to candidates for repair objects to be output to the defect correcting device 302 (step S12). After this process is ended, the process proceeds to step S26.

When a break is caused by the generated repair object in the determination process of step S11, on the other hand, the comment generating section 357 reads a comment to an effect that defect correction cannot be made because a break will occur from the memory 360 (step S13). After this process is ended, the process proceeds to step S22.

After the determination process of step S4 or step S10 is ended, the comment generating section 357 reads a comment to an effect that the defect region is incapable of defect correction from the memory 360 (step S14). After this process is ended, the process proceeds to step S22.

When the defect region does not overlap the node region where the leak defect occurs in the determination process of step S3, the template selecting section 358 selects an optimum template for the defect region from registered templates (step S15) (see FIG. 39). Then, whether a template applicable to the defect region is obtained is determined (step S16). When a template applicable to the defect region is obtained, the process proceeds to step S17. When a template applicable to the defect region is not obtained, the process proceeds to step S22.

When a template applicable to the defect region is obtained in the determination process of step S16, the template selecting section 358 determines whether the applicable template includes a CVD object (step S17). When the applicable template includes a CVD object, the process proceeds to step S18. When the applicable template does not include a CVD object, the process proceeds to step S25.

When the applicable template includes a CVD object in the determination process of step S17, the repair object determining section 356 determines whether the CVD object does not overlap another defect region or another repair object (step S18). When the CVD object overlaps another defect region or another repair object, the process proceeds to step S19. When the CVD object does not overlap another defect region or another repair object, the process proceeds to step S25.

When the CVD object overlaps another defect region or another repair object in the determination process of step S18, the template selecting section 358 determines whether there is another candidate for an applicable template (step S19). When there is another candidate for an applicable template, the process proceeds to step S20, where the next candidate is checked (step S20). Thereafter the process proceeds to step S17. When there is no candidate for an applicable template, the process proceeds to step S21.

When there is no other candidate for an applicable template in the determination process of step S19, the comment generating section 357 reads a comment to an effect that there is no corresponding template from the memory 360 (step S21).

After the process of step S13, S14, or S21 or the determination process of step S16 is ended, the comment generating section 357 determines whether an output message is not set (step S22). When an output message is not set, the process proceeds to step S23. When an output message is set, the process proceeds to step S24.

When an output message is not set in the determination process of step S22, the comment generating section 357 sets a comment to an output message according to an instruction of a user (step S23). When an output message is set in the determination process of step S22, on the other hand, a message to an effect that a part of defect regions are not repairable is read from the memory 360, and output to the display 327 (step S24). After these processes are ended, the process proceeds to step S26.

In addition, after the determination process of step S17 or S18 is ended, the repair object determining section 356 adds the repair object of the obtained template to candidates for repair objects to be output to the defect correcting device 302 (step S25). After this process is ended, the process proceeds to step S26.

After the process of step S12 or S23 to S25 is ended, the control device 301 determines whether appropriate processing has been completed for all defect regions (step S26). When the processing is completed, the process proceeds to step S27. When the processing is not completed, the process proceeds to step S26A to start processing for a next defect region, and then proceeds to step S3.

When the appropriate processing is completed for all the defect regions in the determination process of step S26, the repair removal area calculating section 359 obtains a repair removal area of all of repair objects generated automatically among the output repair object candidates (step S27). After this process is ended, the process proceeds to step S28.

Next, the repair removal area calculating section 359 determines whether the repair removal area of the node region exceeds an upper limit of a removable area (step S28). When the repair removal area of the node region exceeds the upper limit of a removable area, the process proceeds to step S29. When the repair removal area of the node region does not exceed the upper limit of a removable area, the process proceeds to step S32.

When the repair removal area of the node region exceeds the upper limit of a removable area in the determination process of step S28, the control device 301 determines whether to correct only defect regions capable of defect correction (step S29). When only defect regions capable of defect correction are to be corrected, the process proceeds to step S30. When the correction of only defect regions capable of defect correction is not to be made, the process proceeds to step S35. For example, the user is allowed to make a selection in advance as to whether to correct only defect regions capable of defect correction, and selected contents are stored in the memory 360. Then, the above determination is made on the basis of the selected contents.

When only defect regions capable of defect correction are to be corrected in the determination process of step S29, the control device 301 deletes a part of the registered repair objects so as not to exceed the upper limit of a removable area (step S30). Then, the comment generating section 357 of the control device 301 reads a message to an effect that a part of the defect regions cannot be corrected from the memory 360 (step S31).

When the repair removal area of the node region does not exceed the upper limit of a removable area in the determination process of step S28, the comment generating section 357 of the control device 301 determines whether an output message is not set (step S32). When an output message is not set, the process proceeds to step S37. When an output message is set, the process proceeds to step S33.

When an output message is set in the determination process of step S32, the control device 301 determines whether to correct only defect regions capable of defect correction (step S33). When only defect regions capable of defect correction are to be corrected, the process proceeds to step S37. When the correction of only defect regions capable of defect correction is not to be made, the process proceeds to step S34.

After the determination process of step S32 or S33 is ended, the comment generating section 357 of the control device 301 sets a message to an effect that repair objects are obtained successfully (step S37), and then proceeds to step S38. When only defect regions capable of defect correction are to be corrected in the determination process of step S33, on the other hand, the comment generating section 357 of the control device 301 reads a message to an effect that the defect regions are incapable of correction from the memory 360 (step S34), and then proceeds to step S36.

When the correction of only defect regions capable of defect correction is not to be made in the determination process of step S29, the comment generating section 357 of the control device 301 reads a message to an effect that defect correction cannot be made because the repair removal area exceeds the upper limit from the memory 360 (step S35).

After the process of step S34 or S35 is ended, the control device 301 clears all the output repair object candidates (step S36), and then proceeds to step S38.

Then, after the process of step S31, S37, or S36 is ended, repair objects that can be output and the message are output to the display 327 (step S38). When this process is ended, the process of obtaining the defect correcting method (repair object) for the leak defect is ended.

In the above-described embodiment, region information formed within the registered repetitive pattern is defined, and the automatic generation of a defect correcting method (repair object) from an actual defect region of an interlayer short-circuit defect and the determination of whether the defect correcting method can be carried out are performed. Thereby, the correction of an interlayer short-circuit defect, which defect correction has been unable to be automated in the past, can be automated.

While examples of respective embodiments of the present disclosure have been described above, the present disclosure is not limited to the above examples of the respective embodiments, but of course includes other examples of modification and examples of application without departing from the spirit of the present disclosure described in claims.

For example, in the above-described embodiments, description has been made of a case of making defect correction in a design pattern formed on a glass substrate of a flat panel display. However, a target of correction is not limited to this example. The defect correction is for example applicable to a predetermined pattern formed on a correction target substrate such as a semiconductor wafer, a photomask, a magnetic disk or the like.

In addition, the series of processes performed in the control device 301 of the defect correcting apparatus 300 can be performed by hardware and can be performed by software. In addition, it is needless to say that functions of performing these processes can also be realized by a combination of hardware and software. When the series of processes is to be carried out by software, a program constituting the software is installed from a program recording medium onto a computer incorporated in dedicated hardware or for example a general-purpose personal computer that can perform various functions by installing various programs thereon.

In the control device 301 shown in FIG. 5, an arithmetic processing device such as an MPU or the like executes a program recorded in a nonvolatile memory to realize intended functions. However, each functional block shown in FIG. 5 may be realized by an individual program. In addition, a plurality of functional blocks may be realized by one program. In addition, the functional blocks shown in FIG. 5 may be realized by hardware.

In addition, there may be a configuration in which the correcting method database 325 is stored in a remote server rather than the defect correcting apparatus 300, and the correcting method database 325 is accessed via a network such as a LAN, the Internet, and the like to obtain a defect correcting method.

In addition, the process steps in the present specification include not only processes performed in time series in the described order but also processes not necessarily performed in time series but performed in parallel or individually (for example parallel processing or processing based on an object).

The present disclosure contains subject matter related to that disclosed in Japanese Priority Patent Application JP 2010-210070 filed in the Japan Patent Office on Sep. 17, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A defect correcting apparatus comprising:
    a defect detecting device configured to detect a defect within a repetitive pattern in a multilayer substrate;
    a defect correcting device configured to correct the defect in said multilayer substrate by a specified defect correcting method; and
    a control device configured to, when the defect detected by said defect detecting device is detected overlapping a region in which occurrence of an interlayer short-circuit defect is assumed, (1) generate an object corresponding to the defect correcting method for the interlayer short-circuit defect, and (2) control said defect correcting device to correct said defect using the generated object.

2. The defect correcting apparatus according to claim 1, wherein said control device generates an object for directly irradiating said defect with a laser when an area of said detected defect is smaller than a predetermined area, and generates an object for performing laser irradiation so as to surround a periphery of said defect when the area of said detected defect is larger than the predetermined area.

3. The defect correcting apparatus according to claim 2, wherein when a circuit in a region other than the region in which the occurrence of said interlayer short-circuit defect is assumed is affected assuming that the defect correcting method is performed on a basis of said generated object, said control device performs control so as not to make defect correction.

4. The defect correcting apparatus according to claim 3, wherein when an area of defect correction made to the region in which the occurrence of said interlayer short-circuit defect is assumed when the defect correcting method is performed on the basis of said generated object exceeds a predetermined area, said control device performs control so as not to make the defect correction.

5. The defect correcting apparatus according to claim 1, further comprising a database storing a plurality of objects registered as defect correcting methods,
    wherein when the defect detected by said defect detecting device is detected not overlapping the region in which the occurrence of the interlayer short-circuit defect is assumed, said control device reads an object suitable for said defect from said database, and controls said defect correcting device using the read object.

6. A defect correcting method comprising:
    detecting a defect within a repetitive pattern in a multilayer substrate by a defect detecting device in a defect correcting apparatus;
    when the defect detected by said defect detecting device is detected overlapping a region in which occurrence of an interlayer short-circuit defect is assumed, generating an object corresponding to a defect correcting method for the interlayer short-circuit defect by a control device in said defect correcting apparatus; and
    controlling said defect correcting device to correct said defect using the generated object by said control device.

* * * * *

UNITED STATES PATENT AND TRADEMARK OFFICE
CERTIFICATE OF CORRECTION

| | | |
|---|---|---|
| PATENT NO. | : 8,262,427 B2 | Page 1 of 1 |
| APPLICATION NO. | : 13/228666 | |
| DATED | : September 11, 2012 | |
| INVENTOR(S) | : Akiko Oka, Gaku Izumi and Tomoaki Honda | |

It is certified that error appears in the above-identified patent and that said Letters Patent is hereby corrected as shown below:

On the title page, item

(75) "Tomoaki Honda, Aihi (JP)"

should be

(75) --Tomoaki Honda, Aichi (JP)--

Signed and Sealed this
Twenty-seventh Day of November, 2012

David J. Kappos
*Director of the United States Patent and Trademark Office*